US006604080B1

(12) United States Patent
Kern

(10) Patent No.: US 6,604,080 B1
(45) Date of Patent: Aug. 5, 2003

(54) COMPUTER SYSTEM AND METHODS FOR SUPPORTING WORKERS' COMPENSATION/ EMPLOYERS LIABILITY INSURANCE

(75) Inventor: David G. Kern, Baton Rouge, LA (US)

(73) Assignee: B&S Underwriters, Inc., Alexandria, LA (US)

( * ) Notice: Subject to any disclaimer, the term of this patent is extended or adjusted under 35 U.S.C. 154(b) by 0 days.

(21) Appl. No.: 08/338,350

(22) Filed: Oct. 5, 1994

Related U.S. Application Data

(63) Continuation of application No. 07/784,183, filed on Oct. 30, 1991, now abandoned.

(51) Int. Cl.$^7$ .............................................. G06F 17/60
(52) U.S. Cl. ......................................................... 705/4
(58) Field of Search ............................... 364/401, 402, 364/406, 408; 395/147, 202, 203, 204, 235, 238; 705/2, 3, 4, 35, 38, 507

(56) References Cited

U.S. PATENT DOCUMENTS

| 4,491,725 A | 1/1985 | Pritchard .................... 235/375 |
| 4,633,397 A | 12/1986 | Macco ....................... 364/406 |
| 4,642,768 A | 2/1987 | Roberts ...................... 364/408 |
| 4,648,038 A | 3/1987 | Roberts et al. ............. 364/408 |
| 4,694,397 A | 9/1987 | Grant et al. ................ 364/408 |
| 4,722,055 A | 1/1988 | Roberts ...................... 364/408 |
| 4,739,478 A | 4/1988 | Roberts et al. ............. 364/408 |
| 4,750,121 A | 6/1988 | Halley et al. ............... 364/408 |
| 4,766,539 A | 8/1988 | Fox ............................ 364/401 |
| 4,831,526 A * | 5/1989 | Luchs et al. .................... 705/4 |
| 4,916,611 A | 4/1990 | Doyle, Jr. et al. .......... 364/401 |
| 4,975,840 A | 12/1990 | DeTore et al. .............. 364/401 |

FOREIGN PATENT DOCUMENTS

EP 332770 A * 9/1989 ........... G06F/17/60

OTHER PUBLICATIONS

Ryan; "Where Do We Go From Here?"; *Best's Review— Property–Casualty Insurance Edition*; v87; p20(5); Jul. 1986; Dialog: File 148, Acct# 0296360.*

(List continued on next page.)

*Primary Examiner*—Tariq R. Hafiz
*Assistant Examiner*—Alexander Kalinowski
(74) *Attorney, Agent, or Firm*—Peter K. Trzyna, Esq.

(57) ABSTRACT

An automated system and method of computing rates to be charged for insurance coverage equivalent to that provided by a standard workers' compensation policy includes coordinating a workers' compensation insurance policy with an employers liability insurance policy to provide the coverage of a standard workers' compensation policy; determining one set of rates for insuring employees in pre-determined employment classifications for the workers' compensation policy and another set of rates for insuring the employees in other pre-determined employment classifications for said employers liability coverage; entering the sets of rates in a memory accessible by a digital computer; computing with the digital computer a first number, representing the amount of premium to be paid for workers' compensation coverage, by multiplying an employer's payroll for the employees in a one of the pre-determined employment classifications times a corresponding rate from the one set of rates, and computing with the digital computer a second number, representing the amount of premium to be paid for employers liability coverage, by multiplying the employer's payroll for employees in a one of the other pre-determined employment classifications times a corresponding rate from the second set of rates, to compute the rates to be charged for insurance coverage equivalent to that provided by the standard workers' compensation policy.

39 Claims, 19 Drawing Sheets

Microfiche Appendix Included
(6 Microfiche, 536 Pages)

OTHER PUBLICATIONS

"Tort Law, Social Plans Can't Handle WC"; *National Underwriter*; v93 n41; pp. 41–42; Oct. 9, 1989; Dialog: File 15, Acct# 00467940.*

Thompson; "Fighting the High Cost of Workers' Comp"; *National Business*; v78 n3; p. 20(7); Mar. 1990; Dialog: File 148, Acct# 04536623.*

"Small Contractors Win Florida Break on Workers Comp" *Journal of Commerce*; Jul. 19, 1990; By: From Wire and Staff Reports; Edition: Five Star Section; Section: INS; p. 9A; Dialog: File 637, Acct# 06001388.*

Pierre; "Under Repair: Mending the Ailing Workers' Compensation Law"; *Florida Business—Southwest*; v8 n8 s1; p. 20; Aug. 1990; Dialog: File 635, Acct# 0157682.*

Tweedy; "Merging Information Systems for Risk and Benefits Managers"; *Risk Management*; v37 n11; p. 64(4); Nov. 1990; Dialog: File 148, Acct# 04875100.*

Iskowe, et al.; "Behind the Scenes of the Workers' Comp Crisis"; *Risk Management*; v37 n11; p. 52(7); Nov. 1990; Dialog: File 148, Acct# 04875099.*

Pfleeger; Machine Organization; Copyright 1982 by John Wiley & Sons 1982.*

"The Retrospective Premium Endorsement Rating Option of the Natl Council on Compensation Insurance's New Workers Compensation and Employers Liability Insurance Policy is Presented"; *Business Insurance*; Jan. 24, 1983; p. 17–19; Dialog 190 00870614.*

Randall, H.; "Why Insurance is Assurance", Computer Dealer; v7 n4; p51–52; Apr., 1984; Dialog # 00547811.*

Adler, Stacy; "Wrap–up Program Saves Millions: Plan Covers Construction at Washington Airports"; *Business Insurance*; Apr. 29, 1991; p. 166; Dialog # 03121058.*

Adler, Stacy; Risk Management Honor Roll; *Business Insurance*; Apr. 29, 1991; p. 161; Dialog # 03121054.*

"Metropolitan Washington Airports Authority Argonaut Insurance Company Master Worker's Compensation Policy Retrospective Rating Agreement".

Argonaut Insurance Document and Cover Note.

"Proceedings," The New Policy Form For Workers' Compensation Insurance, pp. 97–100.

Insurance Advocate article, Feb. 5, 1983, "The New (1983) Workers Compensation And Employers Liability Policy, Product Of Many Minds, Is Model of Clarity," by D.T. DeCarlo.

"The new–look WC policy," by Tom Marshall, Professional Agent, Jun. 1992.

"Using The New Workers Compensation Policy," The Risk Report, vol. VI, No. 8.

Standard Insurance Policy Forms.

FC&S Bulletins, Forms Workers Comp, Fz–1, Aug., 1992, National Council on Compensation Insurance.

FC&S Bulletins, Forms Workers Comp, Fy–1, Aug., 1992, National Council on Compensation Insurance.

Presidential Fire & Casualty Company, Employers Liability—Named Peril—Policy.

Citizens Security Life Insurance Company, Blanket Health policies.

Presidential Fire & Casualty Insurance Company, Employers Liability Insurance Policy.

Presidential Fire & Casualty Company, Employers Liability Insurance Endorsement.

"Business Costs Are Soaring" brochure. ©1988–1989.

Guarantee Mutual Life Company, "Employers Death, Disability Burial and Medical Benefits Policy".

Homestead Insurance Company, Employers Liability—Named Peril—Policy. May 1991.

A copy of screens produced by First Choice.

A print out of the screens generated by M&M's computer system.

Print outs of computerized insurance premium calculating systems.

Citizens Security Worksheet.

"Alabama firms sue 17 writers of work comp," *Business Insurance*, Feb. 24, 1992, quote.

"Insurers Tout Alternative Work Comp Products," *Business Insurance*, Aug. 2, 1993 article.

* cited by examiner

FIG. 4

"THE ALTERNATE PLAN"™

INSURED: ⬜
ADDRESS: ⬜
PARISH:
PHONE: (⬜)⬜

AGENT: ⬜
ADDRESS:
PHONE: (⬜)⬜
I.D. NUMBER: ⬜
CONSENT TO RATE: 1.00

| POLICY "A" CLASSIFICATION | CODE | NUMBER OF EMPLOYEES | | PAYROLL | RATE | PREMIUM |
|---|---|---|---|---|---|---|
| | | PART TIME | FULL TIME | | | |
| | | | | | | |

Estimated Annual Premium:
Premium Discount: % ⬜
M or S premium: ⬜
Less Indemn. End.: ⬜

Add Policy Fee:   100.00
Sub Total:
ADD 3% TAX:
TOTAL ANNUAL: ⬜

F3-NEXT   F4-PREV   F5-SAVE   F6-FIND   F7-DELETE   F9-PRINT   F10-EXIT

FIG. 5

| | "THE ALTERNATE PLAN"™ | |
|---|---|---|
| INSURED: ☐<br>ADDRESS:<br>PARISH:<br>PHONE: (☐)☐ | | AGENT: ☐<br>ADDRESS:<br>PHONE: (☐)☐<br>I.D. NUMBER: ☐ |

| POLICY "B" CLASSIFICATION | CODE | NUMBER OF EMPLOYEES | | PAYROLL | RATE | PREMIUM |
|---|---|---|---|---|---|---|
| | | PART TIME | FULL TIME | | | |
| | | | | | | |

Estimated Annual E/L Premium: ☐
Add Policy Fee: 100.00
Sub Total:
TOTAL ANNUAL: ☐

F3-NEXT   F4-PREV   F5-SAVE   F6-FIND   F7-DELETE   F9-PRINT   F10-EXIT

FIG. 6

Estimated Annual Premium:
Less Premium Discount:
Less Indemnification End:
Add Policy
Sub Total:
Add 3% Tax:
TOTAL ANNUAL:

Estimated E/L Premiums:
Add Policy Fee:
Sub Total:
TOTAL ANNUAL:

Does employer have night depository off premises? Y / N
Does employer have FIRST-AID on the premises: Y / N Requested Effective Date:
Date Prepaid:
Total of all policies:
Total down payment deposit:

F3-NEXT   F4-PREV   F5-SAVE   F6-FIND   F7-DELETE   F9-PRINT   F10-EXIT

FIG. 7

| Louisiana ONLY | B & S UNDERWRITERS, INC. |
|---|---|
| | P. O. BOX 13396, ALEXANDRIA, LA. 71315-3308 |

| INSURED - ADDRESS & TELEPHONE | BROKER |
|---|---|
| PARISH | I. D. NO. |

| POLICY "A" CLASSIFICATION | CODE | NO. EMP. F/P | PAYROLL | RATE | PREMIUM |
|---|---|---|---|---|---|
| | | | | | |
| | | | | | |
| | | | | | |
| | | | | | |
| | | | | | |
| | | | Estimated Annual Premium | | |
| | | | Less Discount | | |
| | | | Less Indemnification End. | | |
| | | | Sub Total | | |
| | | | Add Policy Fee | | + 100.00 |
| | | | Sub Total | | |
| | | | Add 3 % Tax | | |
| | | | TOTAL ANNUAL | | |

| POLICY "B" CLASSIFICATION | CODE | NO. EMP. F/P | PAYROLL | RATE | PREMIUM |
|---|---|---|---|---|---|
| | | | | | |
| | | | | | |
| | | | | | |
| | | | | | |
| | | | | | |
| | | | Annual Estimated E/L Premium | | |
| | | | Add Policy Fee | | + 100.00 |
| | | | Sub Total | | |
| | | | Annual Estimated Premium | | |

| POLICY "A" | DEPOSIT PREMIUM | ANNUAL | DEPOSIT |
|---|---|---|---|
| Annual Premium (after discount) | | | |
| Plus Policy Fee | | + 100.00 | + 100.00 |
| Sub Total | | | |
| Add 3% Administration Fee | | | |
| POLICY TOTAL | | | |

| POLICY "B" | DEPOSIT PREMIUM | ANNUAL | DEPOSIT |
|---|---|---|---|
| Total Annual Premium | | + 300.00 | + 300.00 |
| Plus Policy Fee | | | |
| Sub Total | | | |

REQUESTED EFFECTIVE DATE:_____ TOTAL OF ALL POLICIES: _____
DATE PREPAID:_____ TOTAL DOWN PAYMENT DEPOSIT: _____

DEPOSIT IS BASED UPON TOTAL ANNUAL PREMIUM FOR ALL POLICIES
MONTHLY DEPOSIT     $5,000 and over         2/12 OF ANNUAL PREMIUM
QUARTERLY DEPOSIT   $4,000 - $5,000         25% OF ANNUAL PREMIUM
SEMI-ANNUAL DEPOSIT $2,000 - $5,000         50% OF ANNUAL PREMIUM
ANNUAL PREMIUMS     -0- - $2,000            100% PAYMENT IN FULL

FIG. 8

"THE ALTERNATE PLAN"™

INSURED:
ADDRESS:
PARISH:
PHONE:

AGENT:
ADDRESS:
PHONE:
I.D. NUMBER
REQUESTED EFFECTIVE DATE:

INSPECTION CONTACT:    PHONE: ( )
ACCOUNTING RECORDS CONTACT:    PHONE: ( )

Any other Insurance written with this insurer (Y/N)   [ ]
Years in business: [ ]   Corporation [ ]   Partnership [ ]
                  Individual [ ]   Other [         ]

Does applicant own, operate or lease aircraft or watercraft    [ ]
Any exposure to flammables, explosives, caustics, or fumes    [ ]
Any coverage declined, cancelled, non-renewed in the last 5 years    [ ]

Part-time or seasonal employment [ ]    Group transportation provided [ ]
Volunteer or donated labor [ ]    Formal safety program in operation [ ]
Physically handicapped employees [ ]    Athletic team sponsorship [ ]

F3-NEXT   F4-PREV   F5-SAVE   F6-FIND   F7-DELETE   F9-PRINT   F10-EXIT

FIG. 9

```
═══════════════ "THE ALTERNATE PLAN"™ ═══════════════
Part-time or seasonal employment   [ ☐ ]   Group transportation provided        [ ☐ ]
Volunteer or donated labor         [ ☐ ]   Format safety program in operation   [ ☐ ]
Physically handicapped employees   [ ☐ ]   Athletic team sponsorship            [ ☐ ]
```

DEDUCTIBLE (each claim): [_____]

Does employer hire subcontractors: [ ☐ ]
If yes, do they provide certificates of Insurance: [ ☐ ]

[ ☐ ] INCLUDE / [ ☐ ] EXCLUDE executive officers from this policy.

DUTIES: [_____]

CONSENT TO RATE %: [_____]

F3-NEXT   F4-PREV   F5-SAVE   F6-FIND   F7-DELETE   F9-PRINT   F10-EXIT

FIG. 10

| POLICY "A" CLASSIFICATION | CODE | NUMBER OF EMPLOYEES | | PAYROLL | RATE | PREMIUM |
|---|---|---|---|---|---|---|
| | | PART TIME | FULL TIME | | | |
| | | | | | | |

Estimated Annual Premium:
Endorsement Premium (SAF 12.23%):
Premium / Deductible Discount (-):
Total Estimated Annual Premium:
M or D Premium + $100 Exp + 3% Tax:

Interim adjustments of premium shall be made:

[ ] MONTHLY    [ ] QUARTERLY    [ ] SEMI-ANNUALLY    [ ] ANNUALLY

F3-NEXT   F4-PREV   F5-SAVE   F6-FIND   F7-DELETE   F9-PRINT   F10-EXIT

FIG. 11

B & S UNDERWRITERS, INC.
P. O. BOX 13398, ALEXANDRIA, LOUISIANA 71315

APPLICATION FOR EMPLOYERS DEATH, DISABILITY, BURIAL AND MEDICAL BENEFITS POLICY
For On The Job Injuries

| INSURED - ADDRESS & TELEPHONE | SUB AGENT | |
|---|---|---|
| | PRODUCER ID | REQUESTED EFFECTIVE DATE |
| Parish | | |
| Inspection (contact/phone) | Accounting records (contact/phone) | |

| | |
|---|---|
| Any other insurance written with the Insurer Y / N | |
| Years in Business \| Corporation \| Partnership \| Individual    Other | |
| Does applicant own, operate or lease aircraft or watercraft Y / N | |
| Any exposure to flammables / explosives / caustics or fumes Y /N | |
| Any prior coverage declined, cancelled, non-renewed in the last five (5)years Y / N | |
| Part time or seasonal employment Y / N | Group transportation provided Y / N |
| Is there any volunteer or donated labor Y / N | Is there a formal safety program Y / N |
| Any employee with physical handicap Y / N | Are athletic teams sponsored Y / N |
| Any exposure to radio-active material Y / N | Are pre-employment physicals required Y / n |
| Any work performed underground or above 15 feet Y / N | Do you operate in any state other than Louisiana Y / N |
| Any OFFSHORE/OVER-WATER exposure Y / N | DEDUCTIBLE (each claim) |
| Does employer hire subcontractors: Y / N ... If yes, do they provide certificates of insurance: Y / N | |
| If subcontractors do not provide certificates, you must list classifications and payrolls for each below | |
| I hereby INCLUDE / EXCLUDE executive officers from this policy. | DUTIES: |
| Any employees sixteen (16) years old or younger, or older than 60 years: Y / N | Consent to RATE % |

| CLASSIFICATION | CODE | No. Employees F / P | PAYROLL | Certified Rate/100 | PREMIUM |
|---|---|---|---|---|---|
| | | | | | |
| | | | | | |
| | | | | | |
| | | | | | |
| | | | | | |
| | | | | | |
| | | | Annual Estimated Premium | | $ |
| | | | Endorsement Premium (SAF    %) | | $ |
| | | | Premium/Deductible Discount (-) | | $ |
| | | | Total Estimated Annual Premium | | $ |
| | | | M or D Premium $100 Exp + 3% Fee | | $ |

Interim adjustments of premium shall be made:   ☐ MONTHLY   ☐ QUARTERLY   ☐ SEMI-ANNUALLY   ☐ ANNUALLY I understand benefits furnished under R.S.23:1168 (A) (2) are subject to audit that the undersigned produces is not an agent of the company. All payments must be made payable to the general agent and not the undersigned producer. I also understand that only the company may bind coverage which may be issued pursuant to this application. I understand that the premium I am paying for my insurance is higher than those authorized by current Louisiana rates, however, I have tried and made diligent effort in the last 60 days to buy such coverage at premiums based on standard Louisiana rates from a company authorized to write insurance in Louisiana and I have been unable to do so. I have read and understood all of the above.

_____    _____    _____
DATE                                            WITNESS                                APPLICANT'S SIGNATURE

I do certify that I am authorized to sell insurance in Louisiana. I have informed the applicant of all required information by the company and have explained all coverage here offered. In the event that any premium return from this policy, I agree to return this policy, I agree to return the commission portion of such premium to the party, due the return. I do certify that I have informed the application of insurance that premium charges for coverage under this policy are higher than premiums computed according to the rules and classifications in the manual and that applicant is being so informed and having full knowledge of this, consented to pay the entire premium. I acknowledge that only the company may bind coverage and certify that I am not an agent for the company.

_____    _____    _____
DATE                                     B & S AGENT'S SIGNATURE                    A & H LICENSE NO.

FIG. 12

| NATURE OF BUSINESS and DESCRIPTION OF OPERATIONS |
|---|
| Describe all operations and products, manufacturing, raw materials, processes, equipment; contractor type work subcontractors: mercantile-merchandise; customers; deliveries; services; location; farm acreage; animals; machinery |
| |

| | LOCATIONS<br>Street, City, State, Zip |
|---|---|
| 1 | |
| 2 | |
| 3 | |
| 4 | |

PRIOR EXPERIENCE: provide information for last five (5) years & attach comments if necessary

| YEAR | INSURER & POLICY NUMBER | ANNUAL PREMIUM | MOD. | NUMBER OF CLAIMS | LOSSES PAID | RESERVES |
|---|---|---|---|---|---|---|
| | | | | | | |
| | | | | | | |
| | | | | | | |
| | | | | | | |
| | | | | | | |

Partners, Officers, Relatives to be INCLUDED / EXCLUDED
Payroll listed here must be included in classification section on page 1.

| NAME | AGE | Title/Relation | Percent Owner | DUTIES | INC/EXC | Class Code | PAYROLL |
|---|---|---|---|---|---|---|---|
| | | | | | | | |
| | | | | | | | |
| | | | | | | | |
| | | | | | | | |
| | | | | | | | |

REMARKS and EXPLANATIONS:

Underwritten by: Guarantee Mutual Life Company, Omaha, Nebraska
Administered and Claims Paid by: B & S Underwriters, Inc. Alexandria, Louisiana

FIG. 13

```
═══════════════════ "THE ALTERNATE PLAN"™ ═══════════════════
INSURED:   [          ]              AGENT:    [          ]
ADDRESS:   [          ]              ADDRESS:  [          ]
PARISH:    [          ]              PHONE:    ( [   ] ) [       ]
PHONE:     ( [   ] ) [       ]       I.D. NUMBER [       ]
                                     REQUESTED EFFECTIVE DATE: [   ]

INSPECTION CONTACT: [         ]              PHONE: ( [   ] ) [       ]
ACCOUNTING RECORDS CONTACT: [    ]           PHONE: ( [   ] ) [       ]
```

Type of business: [                              ]
Years in business: [ ]  Corporation [ ] Partnership [ ]
                        Individual  [ ] Other [                    ]

Has employer had a permanent disability claim in last 5 years:   [ ]
Has employer had a partial disability claim in last 5 years:     [ ]
Has employer had a law suit filed by an employee in last 5 years: [ ]

Lost time accidents (last 5 years)  [ ]    OSHA violations (last 5 years)  [ ]
Medical losses (last 5 years)       [ ]    Death claim (last 5 years)      [ ]

F3-NEXT   F4-PREV   F5-SAVE   F6-FIND   F7-DELETE   F9-PRINT   F10-EXIT

FIG. 14

"THE ALTERNATE PLAN"™

Part-time or seasonal employment [ ☐ ]  Group transportation provided  [ ☐ ]
Volunteer or donated labor  [ ☐ ]  Format safety program in operation  [ ☐ ]
Physically handicapped employees  [ ☐ ]  Athletic team sponsorship  [ ☐ ]

PREVIOUS CARRIER: [ ]

Total losses paid last five (5) years: [ ☐ ]
Reserves for last five (5) years: [ ☐ ]

Does employer hire subcontractors: [ ☐ ]
If yes, do they provide certificates of Insurance: [ ☐ ]

[ ☐ ] INCLUDE / [ ☐ ] EXCLUDE executive officers from this policy.

LIMITS REQUESTED: [ ]

CONSENT TO RATE %: [ ]

F3-NEXT  F4-PREV  F5-SAVE  F6-FIND  F7-DELETE  F9-PRINT  F10-EXIT

FIG. 15

| POLICY "B" CLASSIFICATION | CODE | NUMBER OF EMPLOYEES | | PAYROLL | RATE | PREMIUM |
|---|---|---|---|---|---|---|
| | | PART TIME | FULL TIME | | | |
| | | | | | | |

Estimated Annual E/L Premium:
M or D premium:
$100.00 expense constant:
Total Deposit Premium:

Interim adjustments of premium shall be made:

[ ] MONTHLY    [ ] QUARTERLY    [ ] SEMI-ANNUALLY    [ ] ANNUALLY

F3-NEXT    F4-PREV    F5-SAVE    F6-FIND    F7-DELETE    F9-PRINT    F10-EXIT

FIG. 16

B & S UNDERWRITERS, INC.
P. O. BOX 13398, ALEXANDRIA, LOUIISIANNA 71315

EMPLOYERS LIABILITY - NAMED PERIL ONLY

| INSURED - ADDRESS & TELEPHONE | BROKER | |
|---|---|---|
| Parish | PRODUCER ID | REQUESTED EFFECTIVE DATE |
| Inspection (contact /phone) | Accounting records (contact/phone) | |

Type of business:

| Years in Business: | Corporation | Partnership | Individual | Other |
|---|---|---|---|---|

Has this employer had a permanent disability claim in the last five (5) years: Y / N (explain on back)
Has this employer had a partial disability claim in last five (5) years: Y / N (explain on back)
Has this employer had a law suit filed by an employee in last five (5) years: Y / N (explain on back)

| Number of lost time accidents last five (5 years: | Number of O.S.H.A. violations last five (5) years: |
|---|---|
| Number of medical losses in last five (5) years: | Has this employer had a death claim in last five (5) years Y / N |
| Previous carrier: | Does this employer have a FIRST-AID on the premises: Y / N |
| Total losses paid last five (5) years $ | Does employer have a night depository off the premises: Y / n |
| Reserves for last five (5) years $ | Do you operate in any state other than Louisiana Y / N |
| Any OFFSHORE/OVER-WATER exposure Y / N | DEDUCTIBLE (each claim) |

Does employer hire subcontractors: Y / N ... If yes, do they provide certificates of insurance: Y / N
If subcontractors do not provide certificates, you must list classifications and payrolls for each below

| I hereby INCLUDE / EXCLUDE executive officers from this policy. | DUTIES: |
|---|---|
| Any employees sixteen (16) years old or younger, or older than 60 years: Y / N | Consent to RATE % |

| CLASSIFICATION | CODE | No. Employees F / P | PAYROLL | Certified Rate/100 | PREMIUM |
|---|---|---|---|---|---|
| | | | | | |
| | | | | | |
| | | | | | |
| | | | | | |
| | | | | | |
| | | | | | |
| | | | | | |
| | | | | | |

| Use back for additional classifications | Annual Estimated E/L Premium | $ |
|---|---|---|
| | M or D Premium | $ |
| | $100.00 expense constant | $ + 100.00 |
| | TOTAL DEPOSIT PREMIUM | $ |

Interim adjustments of premium shall be made: ☐ MONTHLY ☐ QUARTERLY ☐ SEMI-ANNUALLY ☐ ANNUALLY I understand benefits furnished under R.S.23:1168 (A) (2) are subject to audit that the undersigned produces is not an agent of the company. All payments must be made payable to the general agent and not the undersigned producer. I also understand that only the company may bind coverage which may be issued pursuant to this application. I understand that the premium I am paying for my insurance is higher than those authorized by current Louisiana rates, however, I have tried and made diligent effort in the last 60 days to buy such coverage at premiums based on standard Louisiana rates from a company authorized to write insurance in Louisiana and I have been unable to do so. I have read and understood all of the above.

_____  _____
DATE                 APPLICANT'S SIGNATURE

I do certify that I am authorized to sell insurance in Louisiana. I have informed the applicant of all required information by the company and have explained all coverage here offered. In the event that any premium return from this policy, I agree to return this policy, I agree to return the commission portion of such premium to the party, due the return. I do certify that I have informed the application of insurance that premium charges for coverage under this policy are higher than premiums computed according to the rules and classifications in the manual and that applicant is being so informed and having full knowledge of this, consented to pay the entire premium. I acknowledge that only the company may bind coverage and certify that I am not an agent for the company.

_____  _____
DATE                 BROKER'S SIGNATURE

FIG. 17

| NATURE OF BUSINESS and DESCRIPTION OF OPERATIONS |
|---|
| Describe all operations and products, manufacturing, raw materials, processes, equipment; contractor type work subcontractors: mercantile-merchandise; customers; deliveries; services; location; farm acreage; animals; machinery |

| | LOCATIONS Street, City, State, Zip |
|---|---|
| 1 | |
| 2 | |
| 3 | |
| 4 | |

PRIOR EXPERIENCE: provide information for last five (5) years & attach comments if necessary

| YEAR | INSURER & POLICY NUMBER | ANNUAL PREMIUM | MOD. | NUMBER OF CLAIMS | LOSSES PAID | RESERVES |
|---|---|---|---|---|---|---|
| | | | | | | |
| | | | | | | |
| | | | | | | |
| | | | | | | |
| | | | | | | |

Partners, Officers, Relatives to be INCLUDED / EXCLUDED
Payroll listed here must be included in classification section on page 1.

| NAME | AGE | Title/ Relation | Percent Owner | DUTIES | INC/ EXC | Class Code | PAYROLL |
|---|---|---|---|---|---|---|---|
| | | | | | | | |
| | | | | | | | |
| | | | | | | | |
| | | | | | | | |

REMARKS and EXPLANATIONS:

Underwritten by: Guarantee Mutual Life Company, Hoboken, New Jersey
Administered and Claims Paid by: B & S Underwriters, Inc. Alexandria, Louisiana

FIG. 18

| JOB DESCRIPTION | COVERAGE A | | COVERAGE B | |
|---|---|---|---|---|
| | Code | Rate | Code | Rate |
| ABRASIVE AND SANDBLASTING | 21205 | .01 | 0059D | .05 |
| ABRASIVE PAPER OR CLOTH PREPARATION | 12201 | 3.12 | 1860 | .57 |
| ABRASIVE WHEEL MFG. & DRIVERS | 21301 | 2.83 | 1748 | .52 |
| ACCOUNTANT, AUDITOR | 35001 | .42 | 8803 | .11 |
| ACETYLENE GAS MANUFACTURING & DRIVERS | 24102A | 6.89 | 4635A | 1.40 |
| ADVERTISING COMPANY & DRIVERS | 27907 | 13.71 | 9549 | 3.02 |
| ADVERTISING, SHOP, ERECTION, REPAIRING | 17613 | 11.36 | 9552 | 2.46 |
| AGATE WARE MANUFACTURING | 17609 | 4.83 | 3224 | 1.01 |
| AIR CONDITIONING & HEATING CONTRACTOR | 27202I | 8.13 | 3724 | 1.69 |

F3-NEXT  F4-PREV  F5-SAVE  F6-FIND  F7-DELETE  F9-PRINT  F10-EXIT

EDIT MODE

COMPUTER SYSTEM AND METHODS FOR SUPPORTING WORKERS' COMPENSATION/ EMPLOYERS LIABILITY INSURANCE

This application is a continuation of copending U.S. application Ser. No. 07/784,183, filed Oct. 30, 1991 now abandon.

MICROFICHE APPENDIX INCLUDED

I. BACKGROUND OF THE INVENTION

6 Microfiche, 536 pages

A. Field of the Invention

This invention concerns an electrical computer and a data processing system, and methods involving the same, applied in the financial field of workers' compensation. More particularly, the data processing system supports a new financial product generally characterized as the coordinated separation of workers' compensation benefits and employers liability insurance from their previously combined form known as a standard workers' compensation policy.

B. Organization of This Document

This document is organized as set forth in the following outline table of contents below.

I. BACKGROUND OF THE INVENTION
  A. Field of the Invention
  B. Organization of This Document
II. DESCRIPTION OF THE RELATED ART
  A. Overview
  B. Basic Nature of Workers' Compensation
  C. Different Approaches Used by Different States
    1. State Funds
      a. Monopolistic State Fund
      b. Competitive State Fund
    2. Standard Workers' Compensation Policy
      i. NCCI Role in the Standard Workers' Compensation Market
      ii. Analysis of a Standard Workers' Compensation Policy
      iii. Workers' Compensation Assigned Risk Plans Under a Standard Workers' Compensation Policy
      iv. Disadvantages of a Standard Workers' Compensation Policy
    3. Self-Insurance
      a. Group Self-Insurance
      b. Individual Self-Insurance
    4. Twenty-Four Hour Coverage
    5. ERISA
  D. Summary of the Prior Art
III. SUMMARY OF THE INVENTION
  A. An Innovative Financial Product
  B. A Computerized Rating System
IV. SUMMARY OF THE DRAWINGS
V. DETAILED DESCRIPTION OF A PREFERRED EMBODIMENT OF THE INVENTION AND ITS BEST MODE
VI. CLAIMS Figures or drawings are also a part of this document.

A reason for the great detail in this document is that, in order to truly understand the invention of the data processing system and methods, and the significance of the invention, one must understand the financial product supported by the invention.

II. DESCRIPTION OF THE RELATED ART

A. Overview

Workers' compensation is defined by statutory provisions concerning the relation of master and servant in providing compensation for occupational accidents. But the present statutes are but an evolution of an employers liability principle of law. See, for example, *Cyclopedia of Insurance Law* by George J. Couch, LL.B, published by The Lawyers Co-Operative Publishing Company, Rochester, N.Y. 1929.

In contrast, employers liability insurance, which appears to have been first undertaken in England and which apparently was recognized in America until about 1887, is a contract. Under an employers liability insurance contract, a consideration, or a premium (which is usually based upon or bears a direct ratio to the gross amount of wages paid by the insured), is paid for a specified term to insure an employer against liability for damages on account of bodily injuries, fatal or nonfatal, accidentally suffered by an employee. Under this kind of insurance, the insurer agrees to indemnify the employer for the loss or damage actually sustained by reason of the employers liability to an employee for such an injury or death. See *Cyclopedia of Insurance Law.*

Before workers' compensation laws were enacted, an injured employee pursued his or her case in court under the common law of employers liability, which is derived from the common law of negligence or tort liability. Implicit in this approach was the basic assumption that occupational injuries were always the result of someone's fault, and that the person at fault should bear the costs. One responsibility of the court, therefore, was to ascertain who had been at fault. If the employer alone was responsible for the accident, then the employer was liable for the payment of all resulting damages to the injured worker. On the other hand, if the worker was at fault, he or she lost some, if not all, of the claim upon the employer (or upon society) for financial indemnity and medical care.

The burden of proof for employer's negligence fell upon the worker, a burden often difficult, if not impossible to satisfy. Fellow workers were reluctant to testify against an employer for fear of losing their jobs, and the employer had only to defend successfully against the accusation of negligence. The employer could always fall back on the defenses of contributory negligence, the fellow-servant doctrine, and assumption of risk. As a result, injured workers often failed to bring suit, for when they did, the odds were heavily against their success in an otherwise costly venture. Furthermore, only the injured worker himself had any legal claims. If he died, the survivors and dependents had no basis for legal action.

Statutory efforts known as "employers liability laws" were made to diminish or remove some of the employers common-law defenses so that the injured worker would stand a better chance in court. This legislation could be classified in three categories: (1) statutes denying the right of employers and workers to sign contracts relieving the employer of liability for accidents as a condition of employment, and twenty-seven states had legislated against such practice by 1908; (2) statues extending the right of suit in death cases, and by 1904, 41 jurisdictions had such statutes; and (3) statutes abrogating or modifying the common-law defenses. But by the end of the nineteenth century, a coincidence of increasing industrial injuries and decreasing remedies had produced in the United States a situation ripe for radical change. Thus, when a full account of a German system for compensating injured employees, written in 1893 by John Graham Brooks, was published as the Fourth Special Report of the Commissioner of Labor, legislators all over the country seized upon it as a cue to the direction which efforts at reform might take. *Workers'*

*Compensation Law: Cases, Materials and Text*, by Arthur Larson, published in 1984 by Mathew Bender, New York, N.Y. For example, the Federal Employers Liability Act, adopted in 1908 and applicable to railway employees engaged in interstate commerce, amounted to a codification of statutory improvements up to that time and was an important step forward.

In Chicago in 1910, a conference was attended by representatives of the commissions of the legislatures of Massachusetts, Minnesota, New Jersey, Connecticut, Ohio, Illinois, Wisconsin, Montana, and Washington. And at that conference, a Uniform Workers' Compensation Law as drafted. Although the state acts which followed were anything but uniform, the discussions at this conference did much to set the fundamental pattern of legislation. See *Workmen's Compensation—Prevention, Insurance and Rehabilitation of Occupational Disability*, by Herman Miles Somers, Anne Ramsey Somers, published by John Wiley & Sons, Inc., New York, and Chapman & Hall, Limited, London.

As to actual enactments, the first New York act was passed in 1910. The act had compulsory coverage of certain "hazardous employments." However, the act was held unconstitutional in 1911 by a Court of Appeals, on the ground that the imposition of liability without fault upon the employer was without due process of law under the state and federal constitutions.

Eventually, the law came to recognize an important legislative agreement, and a compromise between employers and workers provided the framework for workers' compensation laws in the United States. Employers agreed to pay benefits to all workers who became disabled or died as the result of an injury that arose out of, and in the course of, employment. Workers agreed to accept workers' compensation as the exclusive remedy against their employers.

For employers, workers' compensation offers immunity from tort suits associated with work-related injuries. Financial obligations are limited, within reasonable bounds, to income lost by injured workers and the cost of medical and rehabilitation care. Costs are reasonably predictable and are generally spread equitably among similarly situated employers and insurance-product customers. This encourages employers to engage in safety and loss prevention activities to limit their compensation costs.

Workers, in turn, are guaranteed protection from the economic loss and the financial burdens of medical and rehabilitation care that frequently accompany injury. For them, workers' compensation provides a convenient, minimally adversarial, and speedy benefit delivery mechanism. No longer do the vagaries of tort law apply to workers whose ability to work is impaired or terminated as a result of an employment-related injury. Contributory negligence, assumption of risk, and fellow employee doctrines of fault have no effect on a worker's ability to recover under workers' compensation. This protection generally extends to all covered workers solely because of the existence of an employer/employee relationship. The U.S. Supreme Court observed in *Cudahay Packaging Co. v. Parramore*, 263 U.S. 418 (1924) that: "This liability is based, not upon any act or omission by the employer, but upon the existence of the relationship which the employee bears to the employment because of and in the course of which he has been injured." See generally, *The Constitutionality of Compulsory Workmen's Compensation Acts*, by Samuel B. Horovitz and Josephine H. Klein, reprinted from Proceedings, International Association of Industrial Accident Boards and Commissions, Twenty-fifth Annual Convention, Charleston, W. Va., Sep. 26–29, 1938. Bulletin No. 26 United States Department of Labor, Division of Labor Standards.

Presently, the constitutionality of compensation acts in various states is clearly and firmly established. However, in the evolution of court decisions to achieve constitutionality of the workers' compensation scheme, there evolved a lack of uniformity of coverage in the United States. Some states limit their acts to hazardous industries only and omit all others; many omit farm laborers and domestic servants; others make it compulsory as to all public employment, and elective as to private employments. See *Issues in Insurances*—Volume I—Everett Randall.

B. Basic Nature of Workers' Compensation

Workers' compensation provides cash benefits and medical care to victims of work-connected injuries. There is a workers' compensation act in each of the 50 states; no two are exactly alike, but many of the basic features of these acts are similar, as outlined in this section.

The first aspect of the workers' compensation program which should be noted is that not all injuries which occur to an employee at his or her place of work will lead to workers' compensation benefits. The normal requisite for compensation is that the employee must suffer a "personal injury by accident arising out of and in the course of employment." The impact of the requirement is to exclude from the scope of the program a variety of injuries, such as a wound obtained in a scuffle among fellow employees, which was obviously triggered by a nonwork-connected dispute.

One feature that distinguishes workers' compensation from most other legal systems that provide recompense to individuals for damages which have occurred to them is not, however, that some injuries are excluded from the coverage of the act, but that many injuries are eligible for benefits which would not meet the normal legal tests for damages. This broadened eligibility primarily occurs because an injured worker can recover benefits from his or her employer even if he or she was guilty of contributory negligence and the employer was free of negligence or other fault which might have caused the injury.

The workers' compensation acts require that the employer furnish employees with medical care for work-connected injuries, although in some cases, there may be limits on the amount of medical care that the employer must provide for any particular employee. If the worker is fatally injured, the employer is required to provide burial expenses. There are also cash benefits for injured employees, which are normally divided into the categories of temporary total, permanent total, permanent partial, and death benefits. Temporary total benefits are paid to a worker if he or she is disabled for a duration longer than a time period specified in the workers' compensation act of issues, but is able subsequently to return to work without permanent impairment. Permanent total benefits are paid to the worker who can never return to work. Permanent partial benefits are paid if the worker is eventually able to return to work, but only after a member of his body has either been amputated or has partially or completely lost its usefulness.

The benefits that the worker receives for these types of injuries have several dimensions. An attempt is normally made to replace some portion of lost wages, usually around one-half to two-thirds of the previous earnings, subject to minimum and maximum weekly benefits. It is also common to indemnify the worker for the loss of some bodily member even if this does not result in the loss of wages. The normal procedure is to have a schedule of the number of weeks' benefits due for the loss of any particular part of the body. In addition to benefits which seek to replace wage loss and indemnify the loss of bodily members, normally there are also benefits which seek to compensate any dependents for the loss of support suffered because of the injury to the worker. This mode of benefits is most commonly expressed in a pension for the dependents of a fatally injured victim of an employment accident, but often the same mode can be seen in the benefit schemes for temporary total and permanent total injuries, where the normal benefits are supplemented if the worker has dependents.

Most states not only prescribe the nature of the injuries that are to be compensated and the size of the benefits, but also administer the program. There is usually an administrative agency which supervises the handling of the injured workers' cases and adjudicates any dispute concerning the eligibility for benefits and the extent of the injuries. Normally, the state's judicial system becomes involved in the law of workers' compensation only when a decision of the workers' compensation agency is appealed. Many states also provide vocational or medical rehabilitation services for injured workers, but this is not technically a part of the workers' compensation system.

Despite the involvement of the states in certain aspects of the workers' compensation program, it nonetheless remains a system which is basically privately run. The workers' compensation statute indicates that each employer shall compensate injured workers by a certain formula of benefits, but the decision of how these benefits are to be provided is usually a decision for the employer. See generally, *Interstate Variations in Employers' Costs of Workmens' Compensation*, Effect on Plat Location Exemplified in Michigan by John F. Burton, Jr. (A Study of the Institute of Labor and Industrial Relations—The University of Michigan—Wayne State University), published by the W. E. Upjohn Institute for Employment Research.

C. Different Approaches Used by Different States

With each state passing its own workers' compensation scheme, different approaches were created to allow employers to meet statutory obligations to provide workers' compensation. Most states passed a compulsory compensation law; a compulsory compensation law requires every employer to accept the act and pay the compensation as specified. In contrast, New Jersey, South Carolina, and Texas provide for an "elective act," whereby the employer has the option to accept or reject the act, but if the employer rejects the act, the employer will be precluded from raising the common-law defenses of assumption of risk, negligence of fellow servants, and contributory negligence.

With regard to insuring against an employers workers' compensation obligation, there are five basic methods: (1) state funds; (2) a standard workers' compensation insurance policy; (3) self-insurance; (4) Twenty-Four Hour Coverage insurance policies and (5) ERISA plans.

1. State Funds a. Monopolistic State Fund

A monopolistic state fund basically requires the employer to buy workers' compensation coverage from the state. For example, the State of Nevada allows individual self-insurance but has a required state fund. The states of Ohio, Washington, and West Virginia permit self-insurance, but have a required state fund. The states of North Dakota and Wyoming do not permit self-insurance and have a required state fund. See 1991 *Analysis of Workers' Compensation Laws*, prepared and published by the U.S. Chamber of Commerce.

In summary, four of the six state fund states allow eligible employers to self-insure or to use the state fund only. North Dakota and Wyoming allow the employer to be insured for the workers' compensation obligation only through the state fund. No other alternatives are accepted. Thus, a standard workers' compensation policy is not available to be sold in the above states.

b. Competitive State Fund

Sixteen states appear to presently offer insurance coverage for workers' compensation through a state fund that competes with the private market. Some of the states included are Arizona, California, Colorado, Idaho, Maryland, Michigan, Minnesota, Montana, New York, Oklahoma, Oregon, Pennsylvania, and Utah. While the monopolistic state fund approach, with the few exceptions noted above, is the only method of securing compensation, those states with a competitive state fund allow the employer the choice to seek workers' compensation coverage through either the state fund or the private insurance marketplace. In October 1991, Louisiana passed a state consitutional amendment allowing it to have a competitive state fund.

The breakdown in each of these states as to what that private insurance marketplace consists of is as follows. Arizona, Michigan, New York, Oklahoma, and Oregon allow individual and group self-insurance and the sale of a standard workers' compensation policy; Maryland permits individual and group self-insurance but group self-insurance is limited to counties, municipalities, and certain private employers, and it also allows the sale of a standard workers' compensation policy; Minnesota permits individual and group self-insurance and allows public corporations and state agencies to establish individual or group self-insurance funds, and it also allows the sale of a standard workers' compensation policy; California, Idaho, Pennsylvania, and Utah permit self-insurance and the sale of a standard workers' compensation policy. 1991 *Analysis of Workers' Compensation Laws*, prepared and published by the U.S. Chamber of Commerce.

2. The Standard Workers' Compensation Policy

The standard workers' compensation policy, which can be issued in 44 states (those without a state fund), is a way by which an insurance company insures the employer against its workers' compensation obligation and its employers liability obligation. That is, the standard workers' compensation policy has two parts. Part A covers workers' compensation, while part B covers employer liability: It is a single insurance policy. See *Louisiana Workers' Compensation Review*, prepared by Independent Insurance Agents of Louisiana.

In 1942, the Section of Insurance Law of the American Bar Association created a committee on workers' compensation and employers liability insurance law and put forth the "Standard Workers' Compensation and Employers Liability Policy." It is important to note that the standard workers' compensation policy combined both policies such that the standard policy is one policy of insurance. The foreword to that publication states "The Standard Workmans Compensation and Employers Liability Policy is dual in its purpose. It affords the insured (A) protection against liability under workers' compensation laws, and (B) protection against liability imposed by law for damages in cases where the Compensation Act does not apply." *Policy Annotations* from the Conference Commentary of the American Bar Association, Insurance Committee.

Traditionally, standard workers' compensation policies have been issued by "P & C" carriers. A "P & C" carrier, in the industry, is a property and casualty insurance company.

That company is known as a property and casualty company because its state-issued "certificate of authority" allows it to write lines of insurance covering property and lines of insurance covering casualty.

According to each state law, a charter may allow the insurance carrier to write many or different lines of insurance business. Each state has a workers' compensation law, but the laws are not identical. For example, Arkansas law provides that under Section 11-9-102 (15) "Carrier—means any stock company, mutual company, or reciprocal or inter-insurance exchange authorized (emphasis added) to write or carry on the business of workers' compensation insurance in this state." But most states give the insurance commissioner of that state the power to authorize an insurance carrier, depending on its charter, a certificate to write workers' compensation insurance. Many states have statutes which allow "alternative equivalents" (i.e., other arrangements of insurance to satisfy the workers' compensation insurance requirements). However, at present, it is believed that many, if not all, states have allowed only standard workers' compensation policies to be issued by property and casualty insurance carriers.

i. NCCI Role in the Standard Workers' Compensation Market

Early in the development of the enactment of workers' compensation laws, there was a need for a body to coordinate insurance industry activities with the state governments and to provide a systematic determination of costs and a more uniform approach to workers' compensation. In response to this need, the National Council on Compensation Insurance ("NCCI") was founded as an organization of insurers (rather than rating bureaus) and became operational in 1923. At that time, it established prices for companies writing workers' compensation insurance in 10 jurisdictions. Today the NCCI is the largest workers' compensation insurance service organization in the United States; there are over 700 members or subscriber insurance companies and state funds utilizing the services of the NCCI. Each member carrier of the NCCI reports to the NCCI statistical information for the states in which the member carrier writes workers' compensation insurance. Member carriers also adhere to form and rate filings and pay charges and assessments levied against NCCI. NCCI makes rates for 32 jurisdictions and provides technical and production assistance to local statistical organizations in 14 additional jurisdictions. NCCI presently also administers assigned risk plans in over 23 jurisdictions. With regard to pricing of a standard workers' compensation policy (that single policy in which the first part covers workers' compensation and the second part covers employers liability), the NCCI serves as the primary workers' compensation pricing organization in most states.

It is important to note that there is a difference between being a member of NCCI and being a member of the National Re-insurance Pool. If an insurance company is a member of the latter, then the assessments and assignments are manded. Each state's law varies regarding whether a carrier issuing a standard workers' compensation policy must participate in this national Re-insurance Pool. For example, Louisiana law allows voluntary participation in the National Re-insurance Pool.

The uniform national system for rating occupations for workers' compensation developed by the NCCI includes an assessment of the risk of liability and NCCI's manual, which gives code numbers to specific occupational classifications. (There are presently approximately 700 classifications.) Insurers base their premium by multiplying the rate for a particular occupational classification by the respective payroll per $100 for all of the employers' employees. Because a single employer may have employees which fit under different work classifications, calculating a premium for that employer includes multiplying a rate for each classification of the employer's employees times the payroll for that classification to produce as many subtotals as may be needed for a given employer. These subtotals are then added together to reach the total premium dollar amount for that workers' compensation and employers liability risk. In summary, the rates derived by the NCCI for the risk of workers' compensation and employers liability results in one premium under one policy.

ii. Analysis of a Standard Workers' Compensation Policy

As previously stated, a standard workers' compensation policy insures two concrages in the same policy. Part A insures or indemnifies the employer for all of the statutory workers' compensation obligations which might otherwise be incurred from the suits by injured employees under the stat or states in which the employer does business. Part A covers practically all work-related injuries to employees, and liability is based on a "no fault" basis not on negligence. The workers' compensation statutory remedy is the exclusive remedy or payment to the injured employee.

The standard workers' compensation policy has a "we will pay" clause that states "we will pay promptly when due the benefits required of you by the workers' compensation law." The standard workers' compensation policy also has a "conformity to satute" clause ("terms of this insurance that conflict with the workers' compensation law are changed by this statement to conform to that law"), which in essence says that the insurance carrier will indemnify the employer for the remedies which the injured employees has against the employer for workers' compensation under that particular state's law.

The standard workers' compensation policy, with its "we will pay" clause and "conformity to statute" clause, does not outline the benefits for the state where the policy is issued. Rather, it relies upon these clauses to conform to the benefits provided under that particular state's workers' compensation law.

Because a standard workers' compensation carrier is a property and casualty insurance company, most states have enacted laws which provide that an admitted property and casualty insurance company is backed by a state's Guaranty Association. A Guaranty Association, in the event of insolvency of the issuing insurance company, will pay the injured worker his or her workers' compensation, medical, disability or other payments.

iii. Workers' Compensation Assigned Risk Plans Under a Standard Workers' Compensation Policy Workers' compensation was the first compulsory insurance program adopted in the United States to be underwritten primarily by private insurers. But considerable agitation for state funds to provide the insurance accompanied the rising importance of workers' compensation. Advocates of state funds argued that they were needed to ensure insurer solvency and fair pricing.

Several states established such funds, but the coverage continued to be written by private insurers. As some private insurers began to evaluate the risks over time, based on loss history data, companies began to reject workers' compensation coverage for certain employers. When these employers were unable to obtain workers' compensation coverage, they lobbied their state legislatures, maintaining that because their particular industry was vital to that state, the state should require those insurance companies to write workers' compensation coverage or provide a method for them to get workers' compensation coverage.

In 1929, Minnesota adopted what appears to be the first statute requiring the insurance companies to provide coverage for applicants they did not want to insure. It required the workers' compensation rating bureau of Minnesota to assign a member company to provide coverage for any employer that had been refused coverage by three bureau members. It provided in part:

"When any such rejected risk is called to its attention and it appears that said risks is in good faith entitled to coverage, said bureau shall fix the initial premium therefor, and upon its payment, such bureau shall designate a member whose duty it shall be to issue a policy containing the usual and customary provisions found in such policies therefor but for such undertaking all members of such bureau shall be reinsurers as among themselves in the amount which the compensation insurance written in this state during the preceding calendar year by such member bears to the total compensation insurance written in this state during the preceding calendar year by such member bears to the total compensation insurance written in this state during the preceding year by all the members of the said bureau."

Issues in Insurance

The pro rata sharing of the mandated exposures among insurers on the basis of their shares of the business in the state has become the model for most other residual market plans. By 1936, workers' compensation assigned risk plans had been established in sixteen states and the District of Columbia. Most of them were "voluntary plans," i.e., not mandated by state law. At that time, a reinsurance program was available so that insurers could reinsure those exposures assigned to them. The reinsurance was not compulsory, but the exposures were fully reinsured if the assigned insurer elected to participate. Typically, the ceding company retained 30 percent of the premium and paid the balance to the reinsurance pool. The assigned insurer provided all services to the insured employer, including a loss adjustment service. Whenever the premiums were inadequate to cover the losses, the reinsurance pool then reimbursed the insurer for all losses incurred and assessments levied on participating companies.

Workers' compensation assigned risk plans are now in operation in the District of Columbia and all states except California, Colorado, Idaho, Maryland, Montana, Nevada, New York, North Dakota, Ohio, Oklahoma, Pennsylvania, Utah, Washington, West Virginia, and Wyoming. In the excepted states, the state funds are required to accept all applicants, so assigned risk plans are not necessary.

Issues in Insurance

The workers' compensation assigned risk plans now operate in a manner quite similar to automobile assigned risk plans. Approximately forty servicing insurers issue all of the policies and provide all services to the insured employers and their employers. All exposures written under the plans by these servicing insurers are reinsured by the approximately 400 participating insures in proportion to their voluntary business in the respective states.

As a majority rule in the average state, the following scenario resulted regarding the assigned risk pool. The workers' compensation assigned risk plan was approved by that state's insurance rating bureau, insurance department, or commission as the method to provide workers' compensation insurance to an employer unable to obtain coverage in the voluntary market. The bureau, insurance department, or commission exercised regulatory power over the assigned risk plan, but selected the NCCI to administer the operation of the plan.

As mentioned earlier, the NCCI presently administers the assigned risk plan in over 23 jurisdictions. Insurance companies that belong to the NCCI joined as a member, subscriber, or service purchaser. By so joining, these companies designate that those states where they write workers' compensation accept as filings, on behalf of the insurance company, the policy and endorsement forms prepared and issued by the NCCI as "Standard" forms. If an insurance company belongs to the NCCI, it has the option to participate in the workers' compensation assigned risk plan.

Once an election to participate in the plan has been made, the company is then obligated to pay its pro-rata liability in the assigned risk plan for all states in which it writes workers' compensation insurance on a voluntary basis. The insurance company is not allowed to choose particular states in which they wish to operate; the carriers have to write in all or none of the states in which they write voluntary compensation business.

iv. Disadvantages of a Standard Workers' Compensation Policy

In addition to actuarial considerations, the pricing of the standard workers' compensation policy reflects many factors. One major factor has been the drying up of the voluntary workers' compensation market due to those companies incurring bad loss ratios. Another factor is the drying up of the voluntary market due to the requirement of carriers being assessed by the NCCI and being forced to take assignments from the assigned risk pool.

The total premiums of the assigned risk pool has increased dramatically along with the number of employers in the pool.

The volume of the assigned risk plan has grown significantly higher each year. As this volume has increased, so has the cost to companies writing voluntary workers' compensation. This transfer of assets cannot be expected to continue indefinitely.

Companies knowing that every dollar of writings in the voluntary market creates significant liabilities and seeing no possibility of relief, are reluctant to write compensation insurance in Louisiana voluntarily. Companies not writing workers' compensation are not subject to an assessment, but if no company elects to write a workers' compensation policy where there will be no one to assess. What becomes of the assigned risk plan then? See *Louisiana Workers' Compensation Review*, prepared by Independent Insurance Agents of Louisiana.

The situation in Louisiana is not unusual. In many other states, such as Florida and Texas, assigned risk plans in recent years have also operated at a loss.

In addition, workers' compensation has what is known in the industry as a long "tail." That is to say, whereas most different claims in books of insurance business, because of the nature of the product, can be closed after a few years, it takes many more years (some estimate 12–15 years) to close out the average workers' compensation book and claims related thereto. As early workers' compensation insurance carriers began increasing their rates because past claims were rising at an unexpected rate, state legislatures defined more accurately and fully the benefits to be paid to an injured worker in those states. As a result of liberal interpretations under old laws and newer laws that offer greater benefits, workers' compensation rates have risen dramatically.

3. Self-Insurance

Self-insurance as a way for funding a workers' compensation obligation is not permitted in the United States in only 3 states (North Dakota, Texas, and Wyoming.) Self-insurance is a provision of law that allows qualifying associations of employers or individual employers, if they have substantial resources, to insure themselves against their workers' compensation and employers liability obligations instead of paying to transfer that risk to an insurance company. Self-insurance can be classified as either group self-insurance or individual self-insurance. The 47 states allowing self-insurance have enacted different laws regulating whether individual and/or group self-insurance is allowed and who may self insure. For example, in Maryland, eligibility for group insurance is limited to counties, municipalities, and certain private employers. In Nebraska, group self-insurance is permitted for any two or more public agencies. (However, the discussion of group self-insurance herein shall be limited to the private sector.) Generally, group self-insurance is regulated by that state's Department of Labor or that state's Industrial Commission.

a. Group Self-Insurance

In those states where group self-insurance is allowed for the private sector, the laws are generally structured to provide for bona fide groups, such as trade associations with a minimum number of members and with a minimum net worth. Because there is a group insuring the risk, the law in some states requires each member be jointly and severally liable for all the risks underwritten by that group. So, for example, in the event that two of five members in a group declare bankruptcy, the remaining three members are liable for all the medical costs, disability costs, and all other workers' compensation costs of those two bankrupt employers' employees. Because such an event could jeopardize the solvency of the remaining three employers, some states require the members to only be liable for their pro rata portion of the risk.

In group self-insurance, a third party administrator manges a trust sponsored by the group (e.g., a trade association). The self insured employers pay their premiums to the trust "pool" along with the other members from which losses are paid as they occur. After sufficient time has elapsed to pay claims, the excess money (premiums) or profits of the pool may be distributed to qualifying employers who helped generate them by maintaining low losses.

Generally, group self-insurance is promoted by insurance agencies or consulting companies who get a trade association such as restaurant owners, retail shop owners, contractors, etc., to offer workers' compensation through a trust to members of the association, the insurance agency, or a self-insurance trust. "Administrators" then enter into a contractual arrangement of up to 30% of collected monies to: (1) administrate the trust; (2) collect premiums; (3) do adjustment claims by hiring adjustors and lawyers and charging the resulting costs back to the group, and (4) generally do all other things an insurance company would do in the resolution of claims.

The obvious disadvantages of group self-insurance are: (1) generally, all members of the group are individually liable, or are at least pro rata liable, for all of the group's workers' compensation bills, if the trust is a non profit trust; (2) the group is generally not protected in the event of insolvency by state guaranty funds; (3) many groups either have no employers liability policy or have minimum limits for bodily injury by accidents or disease, with a $500,000-policy limit; and (4) this is not a fully insured plan that is backed by an insurance company which, in turn, is backed by a guarantee fund.

Often in group self-insurance, if reinsurance for the group is sought, it is in the form of an excess workers' compensation policy.

b. Individual Self-Insurance

The other way an employer can meet the statutory workers' compensation obligation is by being individually self insured. State laws generally require that the employer choosing this option post a bond or have a surety guaranteeing the empolyers' net worth. Also, many times the individual must have a large net worth, for example, $500,000. In response to an application to the state by an individual desiring to be self-insured, if the individual has met statutory requirements, the state will allow that individual to be a "Qualified Self Insurer of Workers' Compensation Benefits." Many employers, after having been qualified to become a self insurer, obtain an excess workers' compensation policy with the employer having a large self insured retention.

The disadvantages of individual self insured programs include the following: (1) control of claims remains in the hands of the employer that is not experienced in adjusting and litigating workers' compensation claims; (2) not every employer can meet the requirements to be individually self-insured due to the minimum requirements for the employer's number of employees or financial net worth; (3) employers liability is excluded if no stand alone employers liability policy is purchased, so that there is no coverage to the employer for: (a) damages for which the employer is liable to a third person by reason of a claim against the employer to recover damages against that third party as a result of an injury to an employee of the insured; (b) damages for care and loss of services of an employee of the insured; or (c) damages for consequential bodily injury to a spouse, child, parent, brother, sister of an injured employee of the insured. The employer under individual self-insurance must self insure all of 3-(a), (b), and (c) items, as well as workers' compensation obligation to employees up to a maximum self insured retention. Still another disadvantage of self-insurance is (4) that if the employer becomes insolvent, there is no state guaranty fund to pay the injured employees medical bills, disability, or other compensation due him.

4. Twenty-Four Hour Coverage

One way different insurance companies have approached solving the workers' compensation obligation is through the use of policies of insurance known as "Twenty-Four Hour Coverage." Under this coverage approach, there appears to be six basic sub-types of coverages.

The first type of coverage is known as a "Twenty-four Hour Coverage Marketing Product." This product is marketed by several multi-line insurers that offer "integrated" management of a client's workers' compensation and group health insurance claims. Most state laws preclude combining the benefits available under workers' compensation with those available under other employee benefit plans, so integration is limited to coordinated claims management and/or utilization of the group health discounted provider rates for workers' compensation claims. The policies remain separated and any differences in benefits and coverage between the policies are retained.

A second type of coverage is Twenty-Four Hour Disability Coverage. Such coverage provides disability benefits for all of an employee's injuries and diseases. But under this type, medical benefits are provided only for work-related injuries and diseases.

A third type of coverage is Twenty-Four Hour Coverage of Accidents (Injuries). Under this insurance product, medical and disability benefits are provided for all accidental injuries, but only work-related diseases are covered.

A fourth type of coverage is Twenty-Four Hour Coverage of Diseases. Such coverage provides medical and disability benefits for all diseases. However, only work- related injuries are covered.

Twenty-Four Hour Medical and Disability Coverage (Universal Disability Program) is a fifth type of coverage. This all-inclusive design provides medical and disability benefits for all diseases and injuries. See generally *Issues in Insurance*.

There is obvious evidence of a renewal of interest in Twenty-Four Hour Coverage. New interest and activity in 1990 include:

1) The new Florida's workers' compensation law allowing employers to obtain a "Twenty-Four Hour health insurance policy" and a "policy providing indemnity benefits" to satisfy the state's workers' compensation requirements (HB 3809);

2) The California Senate Industrial Relations Committee Report, *Healthy Worker-Healthy Workplace: The Productivity Connection*, which recommended integrating workers' compensation, disability and group health insurance into a new mandated state-run insurance program.

3) Alaska's recent creation of a Universal Health Care Task Force to consider the option of combining the worker' compensation system with a universal health care program in order to design either a single comprehensive state-wide system or an integrated system of existing health care coverage as delivery systems for a universal health care program (HB 581);

4) Oregon's Legislative Task Force on innovation in Workers' Compensation Insurance, which is to include consideration on the "feasibility of developing mandatory occupational personal injury protection insurance coverage" and coordinating that coverage with "the mandatory provision of health insurance" (SB 1198) along with the Oregon governor-elect calling for combining employees' health insurance coverage with workers' compensation; and 5) Minnesota's report on "Health Care Costs and Cost Containment in Minnesota Workers' Compensation" issued in March by the Department of Labor and Industry which discussed four Twenty-Four Hour Coverage options, including either mandatory or optional Twenty-Four Hour medical coverage for back disorders only, and Twenty-Four Hour medical and disability coverage for all of an employee's injuries and diseases. Issues in Insurance.

It appears that since the 1980's, several insurers have marketed "Twenty Four Hour Coverage" policies. These policies were advocated as costs savers because of (1) coordinating the claims of non-occupational coverage with occupational (workers' compensation) claims, and (2) using managed care programs of their group health plans (HMO's, PPO's, etc) to reduce medical costs in occupational coverage. Designs of these products include that of CIGNA's "Twenty Four Hour Coverage +" Product, which focuses solely on cost savings through coordinated claims administration. "Back-End" coordination is used to cross check their workers' compensation and group health claims to eliminate double dipping and fraudulent claims. The designs also include that of Consolidated Health Care, which used front end coordination as a cost containment strategy along with back end coordination. Front end coordination involved requiring the provider to identify a claim as work related or not and then using the services of a utilization review along with Blue Cross/Blue Shield medical provider discounts.

Also, CNA and United Heart Land (an AON and Wisconsin Blues Joint venture) began in 1990 to offer Twenty-Four Hour Coverage. CNA uses its group health insurance PPO networks and utilization review for its workers' compensation clients. CNA currently markets its product in Indianapolis, Kansas City, and St. Louis. *Issues in Insurance*.

There have been other insurers who have entered and then left this market: (Blue Cross/Blue Shield of South Carolina with Companion Property and Casualty), thereby raising questions about the profitability of this approach. Those companies who have exited the Twenty-Four Hour Coverage cited among others the reasons for withdrawing the product: (1) Marketing Problems—(A) potential clients have a different risk factor to accident and health insurers than they do to workers, compensation insurers, (B) for large employers, workers' compensation is purchased by risk managers or financial officers, while accident and health insurance is purchased by employee benefit or personnel managers, and (C) because of the differences in workers' compensation and accident and health insurance, even multi-line insurers used two different sellers; (2) Administration Problems—include (A) rating differences—workers' compensation rates are heavily regulated, while group health rates are less regulated, (B) premiums for the two products are calculated and paid differently. Group health premiums are generally determined by the number of employees based upon a monthly payroll census and are paid on a monthly basis, but workers' compensation premium rates are often paid quarterly and are based upon payroll classification codes for employees in each industry and/or an employer's loss experience, and (C) health care insurers gather detailed medical information for care management, while workers' compensation carriers gather actual loss information for rate making purposes. Accordingly, there is a lack of comparable historical medical claim information by health carriers needed to control medical costs. *Issues in insurance*.

Overall roadblocks to Twenty-Four Hour Coverage include: (1) new legislation required authorizing the merger of occupational and non-occupational coverages; (2) the federal Employee Retirement Income Security Act (ERISA) preempts most state regulation of employee benefit plans, such as group health insurance, and preempts even indirect regulation of most benefit plans through state workers' compensation statutes; (3) maintenance of the "exclusive remedy" doctrine worker' compensation laws, which could be threatened by new Twenty-Four Hour Coverage legislation not specifically including it; (4) significant benefit and coverage differences between workers' compensation and other public and private plans (for example, workers' compensation benefits do not have deductibles and co-pay requirements; health insurance policies frequently have richer medical benefit levels than those provided under workers' compensation laws; (5) administrative difficulties imposed by requirements for separate occupational and non-occupational data and operational functions because of federal and state statutory and regulatory requirements, (6) lack of a stand alone employers liability policy sold in conjunction with the Twenty-Four Hour policy (an employer must self insure an employers liability exposure without such a policy); and (7) in those states where workers compensation laws prohibit any employer choice of physician, packages using large volume discount providers (HMO'a, PPO's) cannot be offered for group health and workers compensation medical claims.

Because of the multiple definitions of Twenty-Four Hour Coverage, there has been a wide variety of approaches in the marketplace. An insurer may have variations in the latitude of illness and injuries covered, the benefits provided in its relationship with the employer existing workers' compensation plan. This allows plans to be developed to: (1) retain a workers, compensation plan and then provide a Twenty-Four Hour alternative to existing coverage; (2) take out some of the workers, compensation benefits or coverage and shift the carved out benefits or coverages to a Twenty-Four Hour system; or (3) place occupational injuries or diseases in a new, larger statutory scheme.

5. ERISA

A rapidly developing area of the law that enables an employer to satisfy benefits to injured employees for medical disabilities and other occupational injuries is the use of an employee benefit plan authorized under ERISA, the Employee Retirement Income Security Act enacted the federal law in 1974. ERISA not only applies to pension programs, but to other employee benefit plans as well (see 29 U.S.C. §§ 1001–1461). Specifically included within the scope of ERISA are plans providing medical, surgical, and hospital care benefits or benefits in the event of sickness, accident, disability, or death. ERISA was intended to substitute a federal regulatory scheme for the then existing state regulations and the weak federal statutes then in place.

ERISA specifically preempts "any and all state laws insofar as they may not or hereafter relate to any employee benefit plan" except certain employee benefit plans specifically exempted for the ERISA Act. The most important exemption in the context of this discussion is the one found in 29 U.S.C. § 1003(b)(3) for plans "maintained solely for the purpose of complying with applicable workers' compensation laws or unemployment compensation laws or disability insurance laws" (emphasis added).

On May 18, 1981, the Supreme Court unanimously affirmed the decision of the Third Circuit in Buczynski v. General Motors Corp., 616 F.2d 1238 (1980) sub mon Alessi v. Ray Bestos Manhattan, Inc., 451 U.S. 504, May 18, 1981. In so doing, the court resolved the issue of the right of employers to integrate pension plan benefits with state workers' compensation benefits by reducing the one by the other. The Supreme Court made it clear that qualified plan benefits may be offset by workers' compensation benefits and that state law to the contrary is preempted by ERISA. Absent congressional action, there is no longer any questions that workers' compensation integration is lawful under ERISA. Since Alessi other court cases have aided in the interpretation of Alessi in this expanding area of the law, for example: Shaw v. Delta Air Lines. Inc., 463 U.S. 85, 77 L. Ed. 2d 490.103 S. Ct. 2890 (1983); see also Gibbs v. Service Lloyds Insurance Co. 711 F. Supp. 874 (E.D. Texas, 1989); Foust v. City, Ins. Company, 704 F. Supp. 752 (W.D. Texas, 1989); Stone and Webster Engineering v. Ilsley, 690 F.2d 323 (2d Cir. 1982), aff'd, 463 U.S. 1220 (1983); and Fixx v. United Mine Workers', District 17, 645 F. Supp. 352 (S.D. W.Va. 1986).

Gibbs, held that a plan is not a workers' compensation plan merely because it's benefits are similar to workers' compensation benefits. Moreover, an employee benefits plan cannot be both a workers' compensation plan and a ERISA plan.

Legal efforts to avoid the ERISA preemption and to avoid removal to federal court are often centered on arguments that negligence or pain and suffering are not contemplated by the employee benefit plan. To that argument the Supreme Court recently explained:

"[a] Saw 'relates to' an employee benefit plan, in the normal sense of the phrase, if it has a connection with or reference to such a plan . . . Under this "broad common sense meaning," a state law may "relate to " a benefit plan, and thereby be preempted even if the law is not specifically designed to affect such plans, or the effect is only indirect.

Ingersoll-Rand Co. v. McClendon, 498 U.S. 133, 136 (1990), quoting Shaw v. Delta Air Lines, Inc. 463 U.S. 85, 96 (1985), and Pilot Life Ins. Co. v. Dedeaux, 481 U.S. 41, 47 (1987).

If federal law preempts the state law, the plaintiff's lose state court remedies such as penalties, unfair trade practices remedies, attorney's fees, and other state court remedies.

All of this having been said, there are obvious setbacks to maintaining that ERISA is a broad scale answer to the workers' compensation dilemma in the United States. The current disadvantages of this use of ERISA are set forth below.

(1) Local—Because ERISA is a relatively new statute with few cases interpreting the statute, the law as to how to use ERISA to fund the workers' compensation obligation is unclear in many areas. Additionally, an ERISA plan under 29 U.S.C. § 1003(b)(3) not maintained solely for the purpose of complying with workers' compensation law would be subject to ERISA and state law would be preempted.

(2) Marketing—(a) ERISA Employee Benefit Plans, because of their highly legal technical requirements, generally only allow a large employer that pays a high workers' compensation premium to be cost effective in designing an ERISA plan; (b) most employee benefit plans require the employee to pay a portion of the premiums, but in workers' compensation, the employer pays the entire premium; (c) only workers' compensation policies offer employer liability coverage (so in an ERISA plan, the employer could self insure the employers liability portion, absent combining the plan with a stand alone employers liability policy; and (d) worker's compensation in certain circumstances covers pre-existing conditions while group health plans do not.

D. Summary of the Prior Art

Prior to the financial innovation that underlies the present invention, it is believed that despite the above-mentioned problems in the history of workers, compensation and employers liability, this mode of insurance has been provided by means of a standard workers' compensation policy. A standard workers' compensation policy has been a unitary policy covering worker' compensation and employers liability. This policy is sold by one company charging based on one insurance premium for both coverages.

III. SUMMARY OF THE INVENTION

A. An Innovative Financial Product

In contrast, the present invention is based on the discovery that it is advantageous to unbundle a standard workers' compensation policy into a new financial product having at least two separate, coordinated policies. The new financial product involves using one policy to insure the workers' compensation obligation (Part A of a standard workers' compensation policy), and a second policy, to insure against the employers liability exposure (Part 8 of a standard workers' compensation policy). The first policy can be issued by a life, accident, or health insurance company, and the second policy can be issued by a property and casualty company. This new way of funding a workers, compensation obligation and employers liability exposure on a fully insured basis uses a method of coordinating the coverages under different insurance policies and/or companies using a computerized rating system that is the subject of the present invention.

By severing a standard workers' compensation policy into two parts, many price benefits can be obtained. For example, because a life, accident, and health insurance company would not be considered a workers' compensation insurer and a member of the NCCI, the carrier would not be forced to participate in assignments from the state assigned risk pools; nor would it be forced to assessments by the state plans administered by the NCCI. A property and casualty carrier who is not a member, purchaser, or subscriber of the NCCI and whose charter does not allow it to write workers' compensation insurance in some states, can be used to insure one part of this plan. These savings by the insurance carriers can be passed on to the employer consumer in a reduction of the price of the combination of the two insurance products.

Additionally, in certain states, when the employer is in the assigned risk pool, many times there is a surcharge based upon a percentage of premium added to the price of the standard workers' compensation premium. By taking that employer out of the assigned risk pool, that employer faces no surcharge, thus decreasing again the workers' compensation insurance cost. Depopulating the assigned risk pool is a goal of most commissioners and insurance regulators, and an object of the present invention is to help accomplish that goal.

Presently, it appears that using this combination of policies may be permissible in 15 states. These states appear to be Alabama, Connecticut, Florida, Georgia, Illinois, Iowa, Missouri, Oklahoma, Rhode Island, South Dakota, Utah, West Virginia, Louisiana, Minnesota, and Wisconsin. Two others, Michigan and Oregon, permit the use of equivalent benefits by certain limited categories of employer. But, each of the states needs to be analyzed on a case-by-case basis with regard to whether its insurance denartment's interpretation of the workers' compensation law permits equivalents.

It is important to note that the states mentioned in the preceding paragraph do not require the insurance company issuing the workers' compensation benefits to have its license specifically authorize the company to write workers' compensation insurance. That is, a life, accident, and health carrier does not need to amend its charter to sell health insurance that constitutes the equivalent to the workers' compensation benefits coverage.

In order to insure that there are no gaps in coverage arising from the separation of the workers' compensation exposure from the employers liability exposure, the policies are issued simultaneously to an employer. Additionally, the part A policy has a difference in coverage/condition ("DIC") wording which, in essence, provides that if there are any differences between the terms and conditions of the policy and that which would be paid under that state's workers' compensation statute then the policy is to provide that coverage. Additionally, the part A policy has a "conformity to a standard workers' compensation policy" clause, which provides that if the terms and conditions of this policy would be different than that provided by a standard workers' compensation policy, then the policy is amended to provide for the same coverage, minimum terms, and conditions of that standard workers' compensation policy. To protect the carriers, if one of the policies is cancelled or lapsed, then the other is cancelled. According to each state's interpretation, the part B coverage can have a conformity to a standard employers liability policy clause which provides that if the terms and conditions of this policy would be different than that provided by the standard workers' compensation with the employers liability insurance contained therein) then this policy is amended to provide for the same coverage minimum terms and conditions of that standard employers liability coverage contained in the standard workers' compensation policy.

As noted earlier, Part A of a standard workers' compensation policy does not outline the benefits it will pay under that state law. Under the financial product associated with the present invention, all of the benefits of a particular state's workers' compensation law are preferably put into the terms and conditions of the policy, including medical, disability, death, burial, and other statutory benefits.

An advantage of using a life, accident, and health insurance company is that these carriers have massive data and experience in managing group medical bills or disability costs. These companies have years of experience with cost containment in these areas. These carriers already have existing networks of doctors and hospitals utilized, including HMO's and PPO's, thereby reducing medical costs by being able to analyze the cost of the services performed. (Nationwide, 43% of all workers' compensation cost has been medically related.)

Another advantage of using a life, accident, and health carrier is that the cost to that carrier for its re-insurance is less expensive than traditional workers' compensation insurance.

Still another major advantage of the underlying financial innovation involves its acceptability by the property and casualty insurance agents. Part B of the coverage utilizes "Named Peril Employers Liability" rating codes and classifications, which are already used by property and casualty agents. By then cross-referencing those codes with new codes under the same classification for the other policy (the Employer's Death, Disability, Medical, Burial Policy for job related injuries or a Special Employers Liability Policy) a coverage risk is then rated.

Property and casualty agents first must feel comfortable that there are gaps in coverage in order to market this plan. Additionally, in order to place their client employer with a company on a fully insured basis, the carriers must be quality A. M. Best-rated carriers. By using B+-Rated carriers or better, property and casualty agents have less exposure for claims made against their errors and omissions insurance. Another aspect from a property and casualty agent's perspective is that an agent typically sells workers' compensation insurance and employers other liability coverage (e.g., commercial automobile general liability, etc.). Often times the employer must have an "umbrella" (comprehensive)

policy to cover against catastrophic losses. An umbrella policy generally requires high limits with quality A. M. Best-Rated carriers. The financial innovation underlying the present invention accomplishes all these needs.

One major impediment in the past for accident and health carriers to enter the accident and occupational insurance market has been the difficulty or determining an adequate rate. The integration achieved by this rating system, particularly in a computerized form, enables accident and health carriers to determine an adequate rate for the risk. This financial innovation may be a major stepping stone to the ultimate development of a Twenty-Four Hour insurance policy which will have adequate rates for both occupational and non-occupational injuries and illnesses.

Yet another advantage of the underlying financial product of the present invention is that it is a fully insured plan. In those states where this plan will be admitted not under an assessable mutual plan or a group self-insurance plan, the employer will have first dollar coverage by A. M. Best-rated carriers.

Employers liability insurance is an essential and indispensable protection required by employers. It covers the cost of legal defense and provides coverage against intentional injury claims, dual capacity claims, and third party over claims. While the majority of states still hold that workers' compensation benefits are the exclusive remedy an injured employee has against his employer, employers liability coverage is required to insure in the above-mentioned situations. Employers liability being a part of the combined financial product gives an advantage in marketing over most individual and group self insured plans, Twenty-Four Hour Coverage plans, and ERISA trust plans. The employers liability policy is issued on a separate basis, where it can be sold either on an admitted basis or on a surplus lines basis, according to that state's law. If sold on an admitted basis, that state's guarantee fund for that liability policy is provided. If sold on a surplus lines basis, no guarantee fund protection is available. However, this is mitigated by using quality (B+-rated or better) carriers, and by taking into consideration employers liability claims are few and far between.

Pricing, being one of the most important factors in any marketing plan, is a major advantage of the financial product underlying the present invention. In those states which are not monopolistic and in which the NCCI suggests adequate rates for workers' compensation and which have assigned risk pool assessments or assignments or surcharges for employers in the assigned risk pool, this financial innovation may save an employer up to twenty (20%) percent of the premium compared to a standard workers' compensation policy, yet there still is full statutory coverage with quality carriers. In those states which allow the use of HMO's or PPO's, the savings may be greater.

Further, with regard to the understanding that the employer is in all plans the ultimate responsible party to provide workers' compensation benefits to injured employees in the "compulsory states," the severing of Part A and Part B to a standard workers' compensation policy gives the least exposure to the employer. Under state law, the insurance company is liable to the injured employee. If the insurance company should fail, then the state guarantee fund becomes liable. Then, if the guarantee fund should not pay, the employer must do so. Contrast this with group self-insurance or assessable mutuals, where first the premium pool pays, and, if it becomes insolvent, then all member employers are jointly and severally liable or pro rata liable for all other members' workers' compensation obligation to its injured employees (in those majority of states that do not have guarantee funds or group insurance). In individual self-insurance, the individual employer already pays first dollar up to a retention limit, then the excess insurance begins to pay. In ERISA plans, depending on the structure of the plan, and in Twenty-Four Hour Coverage plans, depending on the states various laws, it is difficult to legally determine if guaranty funds would have to legally be obligated to pay in the event of insolvency of participating insurance carriers.

With regard to the reporting of the statistical data on losses and rates, the states allowing the financial product underlying this invention may instruct a carrier or its designee to report to either the state workers' compensation board, the department of insurance, or the NCCI to track the experience modification (loss history) sustained by each individual employer.

B. A Computerized Rating System

To support this innovative financial product, a computerized rating system and method have been invented. The computer system includes a digital computer having a keyboard, a monitor, a printer, and memory storing a computer program and data. The digital computer can call up the computer program and be controlled by the computer program. (Although it is believed that the computer program could equivalently be implemented in whole or in part in hardware, a software embodiment is believed to be preferable.)

By means of the computer program, the computer computes one rate for a workers' compensation benefits policy and a second rate for an employers liability policy, the policies being coordinated to provide coherent, uniform coverage such as that provided by a standard workers' compensation policy information input at the keyboard to permit computing one of the rates is automatically used to permit computing the other rate. This information is also automatically used to complete or partially complete pre-designed application forms and other documentation printed for the two policies. The computer system also permits printing an illustration comparing the price for a standard workers' compensation policy versus the price for the innovative financial product underlying the present invention. Other documentation is also automatically prepared.

IV. SUMMARY OF THE DRAWINGS

FIG. 4 is a Worksheet screen for part A insurance produced by computer program 2.

FIG. 5 is a Worksheet screen for part B insurance produced by computer program 2.

FIG. 6 is a summary Worksheet screen produced by computer program 2.

FIG. 7 is a pre-printed Customer Worksheet generated by computer program 2.

FIG. 8 is an On The Job Injuries Application screen produced by computer program 2.

FIG. 9 is a second On The Job Injuries Application screen produced by computer program 2.

FIG. 10 is a third On The Job Injuries Application screen produced by computer program 2.

FIGS. 11 and 12 are blank, pre-printed On The Job Injuries Application pages generated by computer program 2.

FIG. 13 is an Employers Liability Application screen produced by computer program 2.

FIG. 14 is a second Employers Liability Application screen produced by computer program 2.

FIG. 15 is a third Employers Liability Application screen produced by computer program 2.

FIGS. 16 and 17 are blank, pre-printed employers Liability Application pages generated by computer program 2.

FIG. 18 is a representative page from a rate book generated by computer program 2.

V. DETAILED DESCRIPTION OF A PREFERRED EMBODIMENT OF THE INVENTION AND ITS BEST MODE

Figure 1:
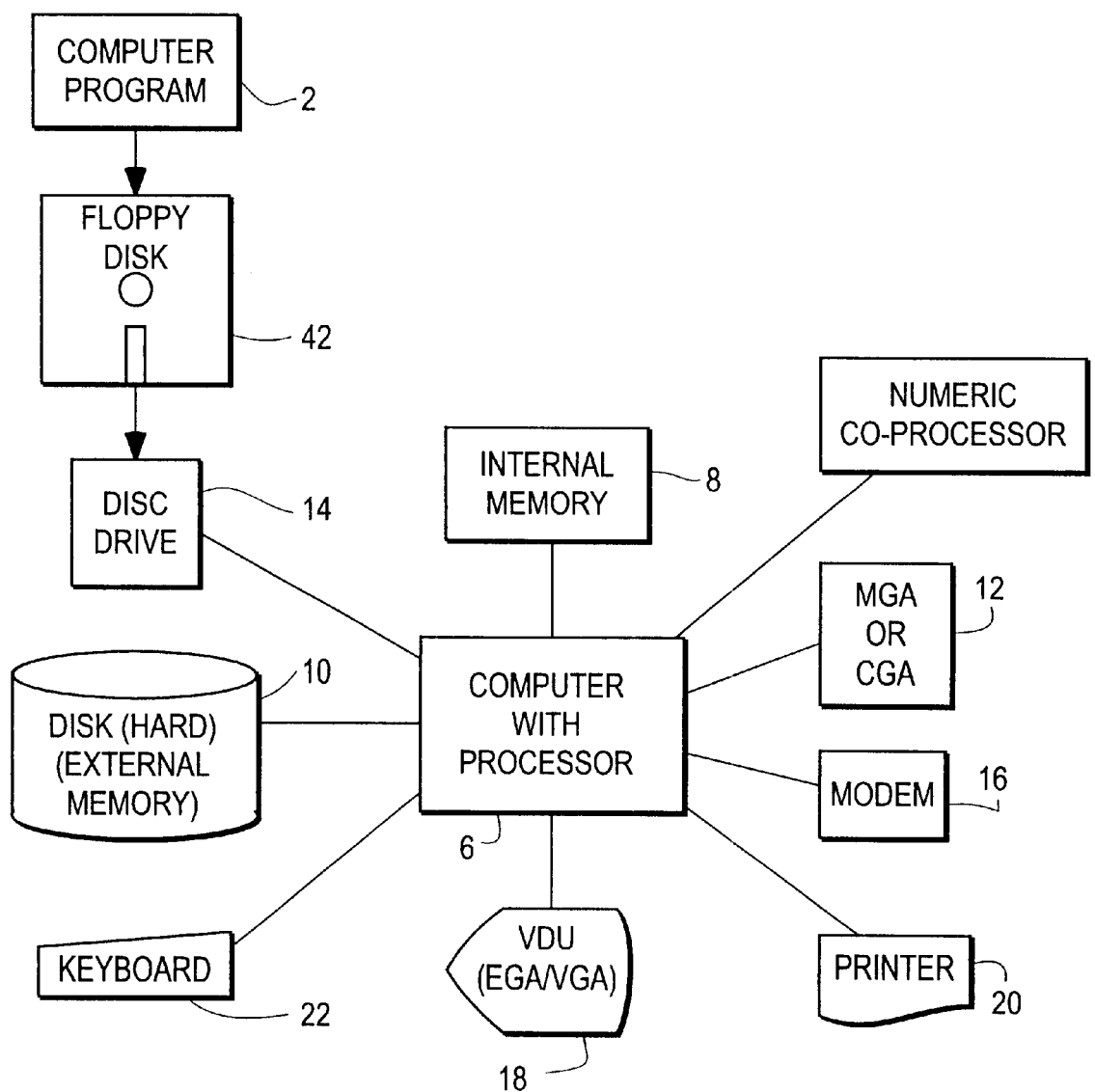
FIG. 1 is a block diagram of the personal computer-based elements that can be used to implement the present invention.

FIG. 1 shows, in block diagram form, personal computer-based elements that can be used to implement the present invention. There is a computer program 2 (rather, a cluster of computer programs), which is provided as an appendix hereto and incorporated by reference herein. Computer program 2 can initially be located on a floppy disc 4, but is installed on a digital computer 6. The digital computer 6 can be an International Business Machines (IBM) personal computer or an equivalent. The digital computer 6 has a processor, such as an 8088 processor, but an 80286 or higher processor is preferable.

The digital computer 6 should have an internal memory 8 of at least 640 K RAM. The digital computer 6 should also be operably connected to a disc drive 14 to allow the computer program 2 on floppy disc 4 to be read. Digital computer 6 should also be able to access external memory 10, for example, a 10 megabyte disc, to store a copy of program 2 and any records generated by the computer program 2.

Digital computer 6 should be equipped with an MGA 12 (Monochrome Graphics Adaptor. e.g., a Hercules or a compatible) or a model number CGA14 (Color Graphics Adaptor), a modem 16 (Hayes or a compatible), and an EGA (Enhanced Graphics Adaptor) or a VGA (Video Graphics Array) for Video Display Unit 18. Digital computer 6 should also have print means, such as a parallel printer interface and an Epson (or compatible) dot matrix printer 20. A terminal or keyboard 22 is used to input data to the digital computer 6.

The computer program 2 is written in the "C" language and structured on a database platform which utilizes BTree ISAM techniques for data storage and retrieval. Subsequently discussed user screens are managed by this same platform through field definition files. These field definition files include field information such as relative XY screen coordinates, type and size of variables, and masking to provide pre-defined screen formats. Also managed by the platform are user calculation formulii (found in the field definition files and interpreted as the user cursors through the field containing the calculation).

Subsequently discussed reporting functions use techniques similar to those used for the user screen management. The fields in each report screen are virtually masked to form a pre-structured page according to specifications provided by an external field definition file. Computer program 2 reads and interprets the field definitions as the report is processed, and records are fetched to meet any requested restriction criteria. Restriction criteria can be provided by the user and is parsed and applied to the data as the report is processed. All reporting is routed through a report processor portion of the computer program 2 with the exception of screen record dumps, which are managed by the database platform. The database platform has the ability to transmit the current screen record to an output device in any page format.

Naturally, many of the programmers might choose different techniques to manage the information required by the computer system (and more generally, by the innovative financial product). For example, two insurance companies might choose to cooperate with each other, and each use a separate computer to separately compute a rate for its policy (i.e., a workers' compensation policy and an employers liability policy). But the techniques described herein offer flexibility over other methods in managing a dynamic application.

Once the computer program 2 is installed and the hardware is powered to run the computer program 2, a Main Menu (FIG. 2) will appear on the Video Display Unit is. The Main Menu (FIG. 2) offers the following selections:

[1] CUSTOMER WORKSHEET
[2] ON THE JOB INJURIES APPLICATION
[3] EMPLOYERS LIABILITY APPLICATION
[4] RATE BOOK MAINTENANCE

The user can enter any of the menu selections by means of input at the keyboard 22.

By choosing [1] from the Main Menu (FIG. 2) the user will cause the computer program 2 to invoke a series of screens. The first of these screens (FIG. 3) has printing options which enable a user to print on the pre-structured forms or to a blank sheet of paper. To print on a pre-structured form, the user answers a prompt "Print Background Y/N" with a "N." To print on a blank sheet of paper, the user answers the same question with "Y."

If more than one (1) copy of the Customer Worksheet is desired, the user enters the number of copies desired in response to a prompt. After answering the two printing option questions, the <F9> function key is depressed, and the computer program 2 will process this information. To default to blank sheet printing and one (1) copy, <F10> can be depressed.

Once the printing parameters have been set, the next screen to appear will be the first of three screens associated with the Customer Worksheet. This first screen pertains to Policy "A"—Workers Compensation Benefits. (See FIG. 4). A cursor will move to each field that needs to be answered, and the user may bypass answering the questions in the first section of this screen if an estimated rate is all that is desired. The information obtained on the customer Worksheet will automatically feed the On the Job Injuries Application the workers; compensation application, FIGS. 8–12) and the Employers Liability Application (FIGS. 13–17).

To move the cursor from field to field, the <ENTER> or the <ARROW DOWN> keys may be depressed. After providing the appropriate information, the user can strike <ENTER> to move to the next field to be answered.

It is assumed that the same agent will be rating these policies time after time. Therefore, once the user has entered data for the "Agent," "Address," "Phone," and I.D. Number" fields, these entries will default to all subsequent Customer Worksheets until such time that the information is changed.

The "Consent to Rate" will default on every new worksheet to 1.00. This rate is a discretionary variable determined by the agent. If a 10% increase in the rate is desired, the user enters 1.10 for the "Consent to Rate" factor. If a 10% reduction in the rate is desired, the user enters 0.90 for the "Consent to Rate" factor. This factor will not only change the premium, but the actual rate as well. This factor can be edited at any time during the completion of the Worksheet.

Once the first section of the Customer Worksheet is filled in, the information for the rating portion of the worksheet may be completed by either entering the desired classification or the code for the desired classification. If the user is unsure of the exact classification, (i.e., because some classifications have more than one listing), the user can enter the main classification. For example, the classification STORE has twenty-two (22) entries. The classification can be designated by locating the cursor in the first field under "Policy 'A' Classifications," typing the word STORE and depressing the <ENTER> key in at the keyboard. (When entering "Classification" information, the classification must be entered in upper case letters.)

The computer system will call up the store classification to the monitor, and the user can scroll up and down with the arrow keys to the appropriate STORE classification entry. When the correct classification is highlighted, the user can strike <ENTER>. This will automatically enter the correct classification, code, and rate in the corresponding fields on the Customer Worksheet. (To facilitate speed and accuracy, the "B" portion of the Customer Worksheet is filled in automatically as the "A" portion of the Worksheet is entered. Likewise, the "B" portion can be answered first and the "A" portion will be automatically filled in.)

If the code for the desired classification is known and the exact classification is unknown, the code (or the first 2 or 3 numbers of the code) can be entered and <ENTER> can be depressed. If the code is entered in its entirety, the corresponding information will be highlighted on the monitor (Video Display unit 18). If only the first 2 or 3 numbers of the code are entered, the computer program 2 will automatically highlight the closest code on the data entered. From this point, the arrow keys can be used to scroll up and down until the correct classification is highlighted. When the correct classification is highlighted, <ENTER> is depressed by the user. This will automatically enter the correct classification, code, and rate in the corresponding fields on the customer Worksheet.

After all the classifications have been entered, and payroll information has been input, the user can scroll down with the <ARROW DOWN> key to the third section of this screen. Or the user can strike the <TAB> key to go directly to the third section. The "Estimated Annual Premium:" field will contain a total of all the above premiums rounded to the nearest dollar.

The next field "Premium Discount: %" is a discount given at the agents discretion and with the approval of the underwriter. This calculation will automatically deduct 5,000.00 off the Estimated Annual Premium and then subtract the appropriate Premium Discount percentage from that difference. If no discount is entered in this filed, then –0.00 will appear in the totals column, and all subsequent totals will remain unchanged.

"M & S Discount: %" (Management Experience and Safety Program Enforcement) is another discount given with the approval of the underwriter. If no discount is entered in this field, then –0.00 will appear in the totals column, and all subsequent totals will remain unchanged.

"Less Indemn. End.: " (indemnification Endorsement) is the premium credit given for selected deductibles by the insured. If no deductible is entered in this field, then –0.00 will appear in the totals column, and all subsequent totals will remain unchanged. If a deductible of 1,000 is desired by the insured, 1000 is entered in this field and the <ENTER> key is depressed. All totals following this are now reduced by the appropriate percentage. At this point, all information associated with Policy "A" has been entered.

For the purposes of this disclosure, it is assumed that the Policy "A" section of the Customer Worksheet was completed first. Therefore, upon completing the Policy "A" section the user strikes the <PAGE DOWN> key. This will invoke the second screen associated with the Customer Worksheet or the Policy "B" section. (See FIG. 5). All of the classifications entered from Policy "A" will have also been entered in this screen along with corresponding codes and rates.

Upon striking the <PAGE DOWN> key, if the Policy "A" section was entered first, all corresponding fields in the Policy "B" section will be automatically completed. If the Policy "B" section is to be completed first, the above procedures can be followed for completing the Customer Worksheet.

To move to the third and final screen associated with the Customer Worksheet, the user strikes the <PAGE DOWN> key. This will invoke the summary portion of the Customer Worksheet. (FIG. 6).

All of the totals from the Policy "A" and Policy "B" sections of the Customer Worksheet are brought forward into this screen. There are only four (4) questions on this screen to be answered. The first question is "Does the employer have a night depository off premises? Y/N." If Y is entered, a warning screen will appear stating that if there is an off premises night depository, a 10% surcharge will be added to the premium. This surcharge will then appear in the totals column. If N is entered, 0.00 will appear in the totals column.

The second question is "Does the employer have first-aid on the premises? Y/N." If N is entered a warning screen will appear to state that if there is no first-aid on the premises, a 25% surcharge will be added to the totals column. If Y is entered, 0.00 will appear in the totals column.

At this point, the only questions left to answer are the Requested Effective Date and the Date Prepaid questions. The "Total of all policies:" field will be automatically calculated, and based on the Premium amount, the "Total down payment deposit:" will appear. This is a minimum amount. The insured has an option to deposit a larger down payment.

The Customer Worksheet is now complete. To save this record, the user strikes <F5>. A new Worksheet will appear at the first screen. (FIG. 6) The preceding procedures can be followed to complete another Worksheet, or the user can strike <F10> to exit.

A blank, pre-printed customer Worksheet appears as FIG. 7.

To search for a previously saved Customer Worksheet data, the user can strike <F6>. This will invoke a search screen. Enter the available information and strike <F6> again. Another screen will appear with all of the previously saved Customer Worksheets. If the desired Worksheet has been saved, it will be highlighted. To select this Worksheet for editing, the user strikes <ENTER>.

If the desired Worksheet has not been saved, the highlight bar will move to the first work Worksheet in the list. The user can scroll through the available Customer Worksheets, by using the <ARROW DOWN> or <ARROW UP> keys. If the desired Customer Worksheet was not previously saved, the user can strike <F8> to add a Worksheet.

The above-described procedures can be used to edit or add data to a Customer Worksheet. To toggle from an ADD MODE to an EDIT MODE, the user strikes <ESC>. To toggle from the EDIT MODE back to the ADD MODE, the user strikes <F8>. Striking <F3> will enable the user to view and edit the previous Worksheet, and striking <F4> will enable the user to view and edit the next Worksheet. Striking <F7> will delete the current Customer Worksheet. If this option is chosen, a prompt will appear at the bottom of the screen: "ARE YOUR SURE? (answer Y or N)."

If Y is entered at the prompt, the current Customer Worksheet will be deleted. If N is entered at the prompt, the user will be returned to the EDIT MODE of the current Customer Worksheet. To print the Customer Worksheet based on the criteria processed in the opening screen of this module, the user strikes <F9>. To exit the Customer Worksheet module, the user strikes <F10>, and answers prompts at the bottom of the screen.

A user choice of [2] from the Main Menu (FIG. 2) will initiate the completion on an on The Job injuries Application (for workers' compensation). Upon entering this module, the first screen to appear is a Print Options screen, which enables the user to print on pre-printed form or to a blank sheet paper. To print on a pre-printed form, the user enters an "N" to the question "Print Background Y/N" with an "N." To print on a blank sheet of paper, the user answers the same question with a "Y."

If more than one (1) copy of the on The Job Injuries Application is required, the user enters the number of copies desired at the prompt.

It is also possible to print binding information, (i.e., the Declaration Sheet, Endorsement, and Audit Reports). These forms are pre-printed and the number of Audit Reports required is based on the interim adjustment of the premium. Samples of these documents are provided in the appendix hereto.

After answering the printing option questions, the user strikes <F6> to process this information. To default to blank sheet printing, one (1) copy, and no binding information, the user strikes <F10>.

Once the printing parameters have been set, the first of three (3) screens associated with the on The Job Injuries Application will appear. (FIG. 8). Information previously entered on the Customer Worksheet will feed this application.

To access the Customer Worksheet that will supply the necessary information to this application, the user enters the EDIT MODE by striking <ESC>. The ADD MODE in the lower left corner of the screen will automatically change to EDIT MODE.

If the user strikes <F6>, a search screen will appear. The user can enter the appropriate information and strike <F6> again. The next screen will be a listing of all previously entered Customer Worksheets. The Worksheet for the applicant whose name was entered in the search screen will be highlighted. If this Worksheet can not be found in the database, the computer system will highlight the closest match to the applicant's name.

To select a Customer Worksheet from the list, the user strikes <ENTER>. All information from this Worksheet will be fed into the On The Job Injuries Application.

The questions in the upper section of the first screen of FIG. 8 can now be answered. The questions in the lower section of the screen and all questions on the second screen in FIG. 9 can either be answered in this mode or left blank for the applicant to manually complete. Leaving the above-referenced questions blank will not prevent the application from being processed. The user merely needs to remember to have the applicant answer these questions before the policy can be binding.

The last screen (FIG. 10) of this group will be filled in with all of the appropriate Classifications, Codes, No. of Employees, Payroll, and Rates pertaining to this application.

Figure 3:
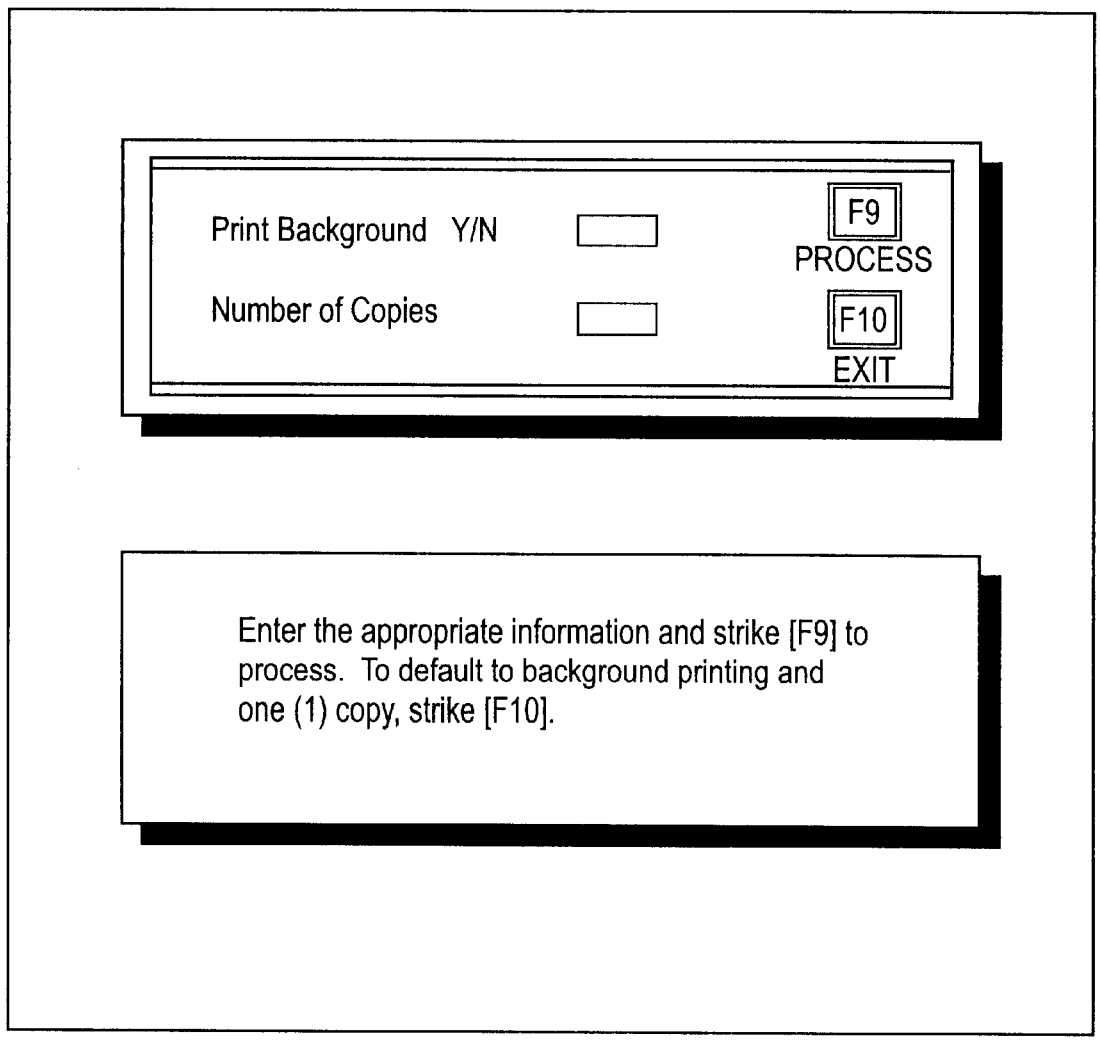
FIG. 3 is a print options screen produced by computer program 2.

To save this application, the user strikes <F5>. To view and/or load previously saved applications other than with a specific search criteria, the user depresses <F3> and <F4> in the EDIT MODE. To delete any previously saved record, <F7> is depressed and a prompt appearing at the bottom of the screen is confirmed. <F9> will process the print criteria established in the Print Options screen (FIG. 3). The printer 20 should be in the on-line mode before striking <F9>. Both the On The Job Injuries Application and the Employers Liability Application will process at the same time, outputting both applications to the printer 20. To exit the On The Job Injuries Application, the user strikes <F10> and answers the confirmatory prompt at the bottom of the screen.

A blank, pre-printed On The Job Injuries Application is shown in FIGS. 11 and 12.

A choice of [3] from the Main Menu (FIG. 2) will initiate the completion of the Employers Liability Application. Upon entering this module, the first screen to appear is a Print Options screen (a screen similar to FIG. 3). Like the previously mentioned print options screen, this screen also enables the user to print on pre-printed forms or to a blank sheet of paper. To print on a pre-printed form, the user answers the question "Print Background Y/N" with an "N." To print on a blank sheet of paper, the user answers the same question with a "Y."

If more than one (1) copy of the Employers Liability Application is required, the number of copies desired is entered in response to a prompt. It is also possible to print the binding information (i.e., the Declaration Sheet and Audit Reports). Exactly as discussed above, these forms are pre-printed and the number of Audit Reports required is based on the interim adjustment of the premium.

After answering the printing option questions, the user strikes <F9> to process this information. To default to blank sheet printing, one (1) copy, and no binding information, the user strikes <F10>.

Once the printing parameters have been set, the first of three (3) screens associated with the Employers Liability Application will appear. (FIG. 13) Information previously entered on the Customer Worksheet will automatically feed the application.

To access the Customer Worksheet that will supply the necessary information to this application, the user enters the EDIT MODE by striking <ESC>. As previously described, the ADD MODE in the lower left corner of the screen will change to EDIT MODE.

If the user strikes <F6>, the search screen will appear. By entering the appropriate information and striking <F6> again, the next screen will be a listing of all previously entered Customer Worksheets. The Worksheet for the applicant whose name was entered in the search screen will be highlighted. If this Worksheet cannot be found in the database, the computer system will highlight the closest match in Applicant's Name.

To select a Customer Worksheet from the list, the user strikes <ENTER>. All information from this Worksheet will be fed into the Employers Liability Application.

The questions in the first section of the first screen FIG. 13 can now be answered. The questions in the second sections of the first screen and all questions on the second screen (FIG. 14) can either be answered in this mode or left blank for the applicant to manually complete. Leaving the above-referenced questions blank, will not prevent the application from being processed, but the applicant must eventually answer these questions before binding the policy is possible.

The last screen (FIG. 15) will be filled in with all of the appropriate Classifications, Codes, No. of Employees, Payroll, and Rates pertaining to this application. To save this application, the user strikes <F5>.

To view and/or load previously saved applications other than with a specific search criteria, the user can depress <F3> and <F4> in the Edit Mode. <F7> is used to delete any previously saved record, and a confirmatory prompt appearing at the bottom of the screen must also be answered. <F9> will process the print criteria established in the Print Options screen. To EXIT the Employers Liability Application, the user strikes <F10> and answers the prompt at the bottom of the screen appropriate.

A sample of a pre-printed Employers Liability Application is given in FIGS. 16 and 17.

A choice of [4] from the Main Menu (FIG. 2) allows the user to edit the Rate Book database. The first screen to appear is a listing of all the information in the database by Job Description, Coverage "A" Code and Rate, and Coverage "B" Code and Rate. (See, e.g., FIG. 18, a portion of the Rate Book). The information that the Customer Worksheet accesses is contained in this database. Editing this information will affect all subsequent Customer Worksheets, On the Job Injuries Applications, and Employers Liability Applications.

<F3> and <F4> will scroll from Job Description to Job Description, next and previous, respectively. To move from left to right across the screen, to access codes and rates, the user strikes <ENTER>.

Upon finding a Job Description, Code, or Rate that needs to be edited, the user moves the cursor to the desired location and makes the necessary change. To save the edited data, the user strikes <F5>. This procedure will save the changes without leaving the rate book maintenance module. If there are many changes to be made, another option is available. If, for example, all the STORE classifications need to be edited, rather than saving after ever edit, the user can strike <F10> once all changes have been made. This option allow the user to save the changes at once, and exit the module after the edited data has been saved. If the <F10> option is desired, a prompt will appear at the bottom of the screen: "Your record has been changed. Do you want to save these changes (Y or N)."

If Y is entered at the prompt, all changes will be saved and the Main Menu (FIG. 2) will appear. If N is entered at the prompt, none of the changes will be saved and another prompt will appear: "Are you sure you want to exit; press Y or N."

If Y is entered at the prompt, the Main Menu (FIG. 2) will appear. If N is entered at the prompt, you will be returned to the EDIT MODE of the rate book maintenance module.

To search for a specific Job Description, Code or Rate, the user strikes <F6>. This will invoke a search screen. The user enters the search criteria, and strikes <F6> again. When the database screen reappears, the cursor will be located at the desired position for editing the entered criteria.

To delete a Job Description and the related Codes and Rates, the user moves the cursor to the appropriate information and strikes <F7>. A prompt will appear at the bottom of the screen: "Are you sure? (answer Y or N)."

If Y is entered at the prompt, the desired information will be deleted from the database and the computer system returns to the EDIT MODE. If N is entered at the prompt, the computer system returns to the EDIT MODE of the rate book maintenance module.

If Job Descriptions, Codes, and Rates need to be added to the database, the user strokes <F8>. The cursor will move to a blank field. By entering the desired Job Description, Codes and Rates and striking <F5> information will be saved to the database.

To exit the rate book maintenance module, the user strokes <F10> or <Esc> and answers questions prompted at the bottom of the screen.

The following is a listing of the function keys and their uses.

| | |
|---|---|
| <ESC> | The <ESC> key has two functions. The first is as a toggle from the ADD MODE to the EDIT MODE. The second use is for exiting from the various modules. Upon striking this key, prompts will appear at the bottom of the screen depending upon the module in which the system is engaged. |
| <TAB> | The <TAB> key allows the user to move downward from one section to another without having to use the <ARROW DOWN> key through each field of a section. |
| <F3> | This key allows the user to view and/or load previously saved records. The <F3> key will scroll to the previous record before the current record. |
| <F4> | This key allows the user to view and/or load previously saved records. The <F4> key will scroll to the next record after the current record. |
| <F5> | This key is used to save currently entered or edited records. |
| <F6> | <F6> is the search key. Striking this key will cause different search screens to appear depending upon the module in which the system is engaged. The computer system will then search the database according to the search criteria. |
| <F7> | This key is used to delete previously saved records. Upon striking the <F7> key, a prompt will appear at the bottom of the screen. |
| <F8> | The <F8> key is used to toggle from the EDIT MODE to the ADD MODE. |
| <F9> | This key is used to process the Print Options information entered at the beginning of each module. Striking the <F9> key will print the current record, along with any associated forms. It will also print as many desired copies as were specified in the print criteria. |
| <F10> | This key is used to exit the different modules of the software. Depending upon which module being exited, different prompts will appear at the bottom of the screen. |
| <ALT>+Z | These two keys, when depressed simultaneously, will invoke a DOS SHELL. This enables the user to shell out to the system to do file maintenance, search directories, etc. To re-enter the instant computer program, the user enters EXIT at a DOS prompt. |

Figure 2:
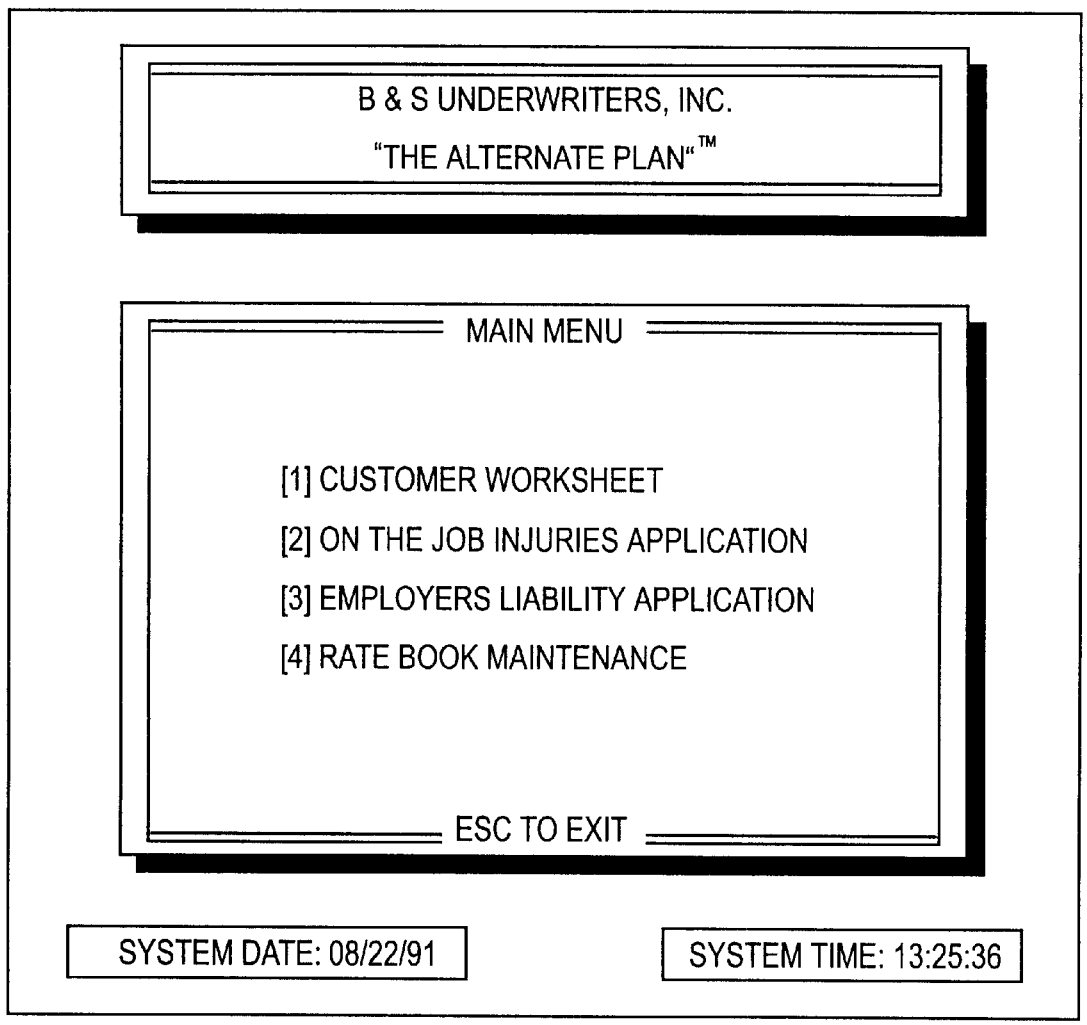
FIG. 2 is the Main Menu produced by computer program, 2.
Figure 19:
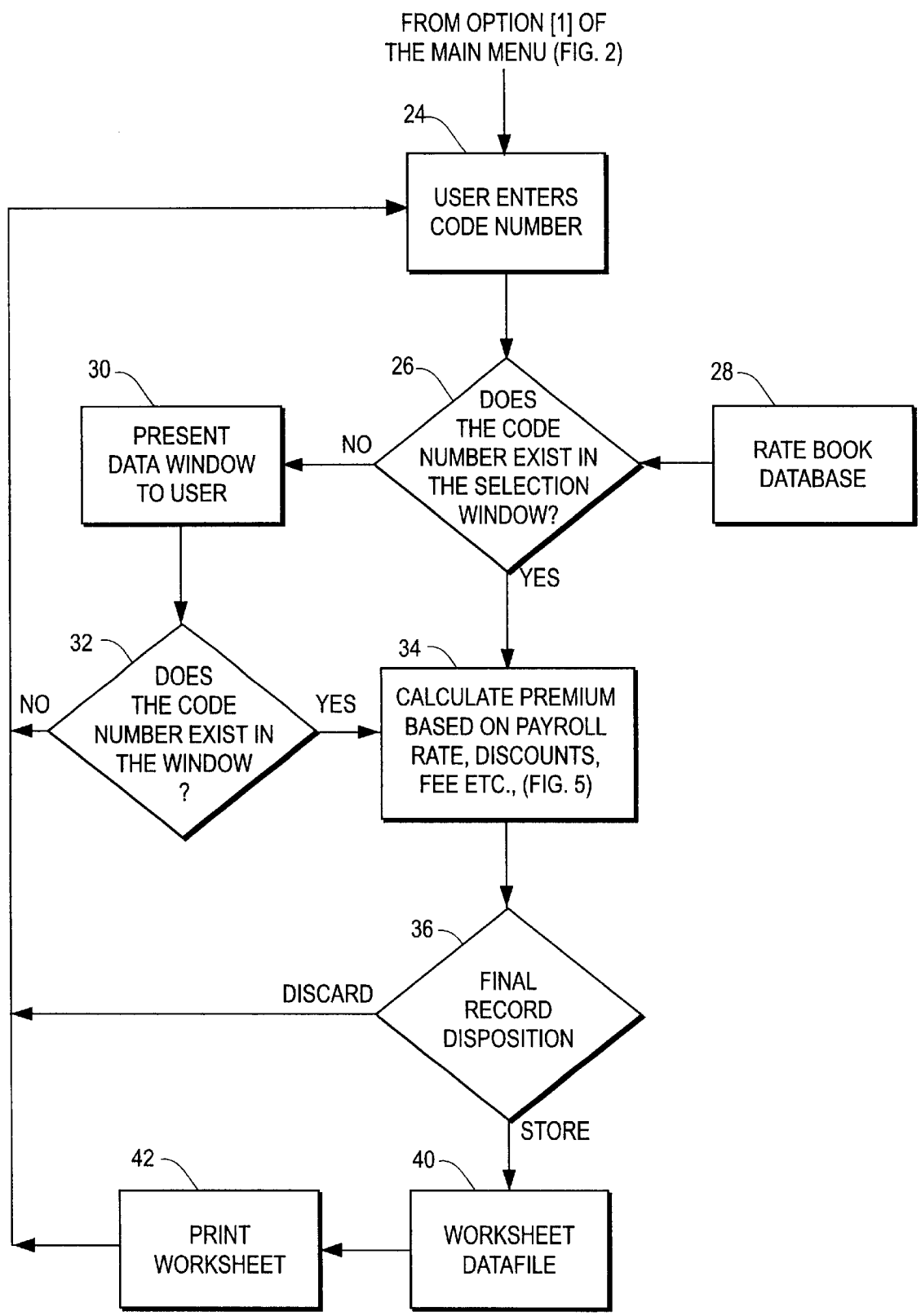
FIG. 19 is a flowchart of the logic of computer program 2 with particular regard to the computation of a premium.

FIG. 19 shows the particular logic of computer program 2 in computing premiums for part A—the same logic is used in computing premiums for part B. The logic commences from the selection of [1] from the Main Menu (FIG. 2). At block 24, the user enters a code number, which is tested for validity at branch 26. If computer program 2 does not find the code number from code/rate database 28, a search screen is presented to the user in block 26 based on data from the database 28. If the user cannot locate the desired code number, as tested in branch 32, the logic returns to block 24.

However, if the code number was successfully identified in branch 26 or branch 32, block 34 uses the data in database 28 (as is discussed subsequently) to calculate the premium. (See FIG. 5).

Thereafter, branch 36 tests whether the user wishes to discard the Worksheet, in which case, the logic returns to block 24. Alternatively, if the user wishes to store the Worksheet, it is saved in Worksheet data file 40. Next, the user has the option to print the Worksheet (e.g., FIG. 3), and the logic returns to block 24.

Rate values per $100 of payroll are stored in the Rate Book database, and there would be a separate set of rates for each state. One set of rates is provided as an appendix hereto. Another set of rates is on file with the Insurance Commissioner of the state of Alabama. The general formula for computing a premium involves multiplying the rates times the respective payrolls for the given rates and these are then summed to produce the premium (plus or minus some adjustments detailed later herein).

More particularly, to illustrate the manner of computing premiums according to the present invention, consider the following hypothetical premium calculations (see the Appendix). Assume that a hypothetical employer, The Glen Retirement Center, located at 103 East Lower Lucas, Shreveport, La. 71115 requests a premium quotation. This information is entered via keyboard 22 in the corresponding section of the Worksheet for the part A policy, along with the name, address, and ID number of the broker.

Under the job classification "convalescent," which corresponds to code 35101A, hypothetically, there are 71 full-time employees and 20 part-time employees for a total payroll of $827,467. This information is entered on the Worksheet, along with the rate for the classification of 6.97. Computer program 2 computes the premium of $57,509.00 by multiplying the rate times the payroll.

Assume too that The Glen Retirement Center has a clerical staff. Under the classification area of the Worksheet, "clerical" is entered. Adjacent thereto, the following are entered: the 35002 code corresponding to this classification, the number of employees (16 full-time), the payroll ($212,471.00), and the 0.52 rate. The premium for this classification is computed to be $1,105.00.

Computer program 2 then computes the sum of the premiums ($57,509.00+$1,105.00=$58,614.00). Discount and indemnification adjustments are entered to produce a subtotal. A policy fee is added, along with a tax, (e.g., 3% to compute a total annual premium of $60,475.42).

As to the part B policy, the convalescent code is 8829A, and the rate is 1.44. (Note that unlike the Standard Workers' Compensation policy prior art, there are two sets of code numbers. One set of code numbers is for the part A policy and another set is for the part B policy). With the number of employees and payroll of course remaining the same as above, a premium of $11,916.00 is computed (i.e., $827,467.00×1.44=$11,916.00). For the clerical employees, code 8810 is used with a rate of 0.09 to produce an estimated premium of $191.00. (i.e., $212,471.00×0.09=$191.00).

A policy fee of $100.00 is also added to produce a subtotal, which equals the Annual Estimated Premium of $12,207.00.

A rate adjustment, such as a rate-up (or rate-down) can be computed, as it is in the present example in which a 1.15 rate-up for both policies is illustrated. That is, the unadjusted rates for these codes are as follows: 35101A (6.04), 35002 (0.45), 8829A (1.25), and 8810 (0.08).

The Worksheet is then used to calculate the deposit premiums for the part A policy. For example, for a monthly deposit for a premium of $5,000.00 or more, ⅙ of the annual premium is a suitable deposit.

Other information is filled out depending on the facts of the case. Of particular interest is the prior history of the employer. This information includes, for example, the name of the insurer, annual premium paid, any modification (an adjustment reflecting whether the employer is a good insurance risk, e.g., 0.91), number of claims in a year (e.g., 13), the amount of losses paid (e.g., $2,690.00) and the reserves, if any (e.g., 0.00). Insurance histories for particular employers are useful in estimating future risk.

In sum, the information is entered on the Worksheet, the computations are handled automatically by computer program 2, and the coordinated applications are filled in automatically and then printed.

To more particularly describe the manner of determining rates so that the premiums can be computed according to the present invention, it should be noted that this invention uses rates different from those used in the prior art. First, (with comparison to, say, NCCI rates) the total rates of the present invention are discounted for part A and part B to reflect the fact that there is no assessment for the unbundled policies. By severing the standard workers' compensation policy into the two policies, neither of the two policies is in the assigned risk pool. Thus, there is no assessment, which is reflected in the lower total rates for the part A and part B policies. Second, in some states, on top of the assessment given to the insurance companies, the insured employer must pay, if in the assigned risk pool, a surcharge. However, the total rates for the separate part A and part B policies in these states have rates that do not have a surcharge. This is because an unbundled set of policies is not in the assigned risk pool. Third, the part A rate is tailored against the part B rate to reflect different statutory risk exposures in different states. For example, in one state, part B may have to be greater than it would be in another state. Nonetheless, the total for the rates for the part A policy and the part B policy of the present invention is less than the singular NCCI rates for the same classifications by sometimes as much as 20%, or more commonly, in the range of 10% to 15%. In any case, the total rates are less than that of the standard workers' compensation rate for the same classification.

What is claimed is:

1. A digital electrical computer system controlled by a program to compute one premium for the workers' compensation benefit coverage and a separate premium for the employers liability coverage, the system comprising:

a digital electrical computer controlled by a computer program in processing input electrical signals, the input electrical signals being produced in response to data entered at a data input device that is electrically connected to the digital electrical computer, the digital electrical computer also being electrically connected to an output device;

a memory, electrically connected to the digital electrical computer, storing a set of rates for at least part of workers' compensation benefit coverage and storing a second set of rates for at least part of employers liability coverage, both said rates corresponding to categories of work that can be done by employees under both of said coverages, both said coverages collectively satisfying all coverage requirements for workers' compensation in at least one state;

and wherein said a digital electrical computer controlled by said computer program controls computing the one premium for the workers' compensation benefit coverage and the separate premium for the employers liability converge in response to at least one of said rates from both said sets of rates stored in said memory and to the data entered at said data input device, said data including an amount of payroll paid to the employees for work in at least one of the categories of work; and wherein the modified electrical signals produce a depiction of the premiums of the output device.

2. The system of claim 1, wherein said memory stores separate sets said sets of said rates for each of a plurality of states.

3. The system of claim 1, wherein said coverages are coordinated to provide coverage equivalent to a standard worker's compensation insurance policy.

4. The system of claim 3, wherein said memory stores one set of both said rates for each of a plurality of states for selectably computing said premiums for a respective state.

5. A method of using a machine in computing premiums to be charged for multiple policy insurance coverage equivalent to that provided by a standard workers' compensation policy, the method comprising the steps of:

entering one set of rates for insuring employees in pre-determined employment classifications for a workers' compensation policy and another set of rates for insuring employees in said pre-determined employment classifications for an employers liability policy in a memory accessible by a digital computer programmed to compute respective premiums to be charged for insurance coverage under the policies and equivalent to coverage provided by a standard workers' compensation policy;

computing with said programmed digital electrical computer a first premium to be paid for the workers' compensation coverage, wherein said computing includes multiplying an employer's payroll for the employees in one of the pre-determined employment classifications for the workers' compensation coverage times a corresponding rate from said one set of rates, and respectively computing with said programmed digital electrical computer a second premium to be paid for the employers liability coverage, wherein said respectively computing includes multiplying the employer's payroll for the employees in one of the pre-determined employment classifications for the employers liability coverage times a corresponding rate from said second set of rates, and computing with said programmed digital electrical computer the premiums to be charged for insurance coverage equivalent to that provided by the standard workers' compensation policy.

6. A process for using a machine to use data entered for a first insurance policy in processing for a second insurance policy that collectively satisfy all statutory coverage requirements for worker's compensation in at least one state without paying either a nongovernmental charge for an assessment or a nongovernmental charge for an assignment, the process comprising:

using a digital electrical computer system, including a processor electrically connected to memory, to input means, and to output means, programmed to receive multiple related insurance policy data at said input means, to store said multiple related insurance policy data in said memory, to process said multiple related insurance policy data into a predefined format, and to generate output data at said output means;

wherein said multiple related insurance policy data includes insurance policy-identifying data representing a first insurance policy and a second insurance policy, the insurance policies selected, sold together in sets, and related to collectively satisfy all statutory coverage requirements for worker's compensation in at least one state without paying either a nongovernmental charge for an assessment or a nongovernmental charge for an assignment; and wherein said output data includes at least a portion of said multiple related insurance policy data presented in said predefined format.

7. The process of claim 6, further comprising the step of controlling the digital electrical computer system with said logic means to receive customer-identifying data for a respective one of the sets, and wherein said output includes at least a portion of said customer-identifying data in said predefined format.

8. The process of claim 7, wherein the customer-identifying information includes premiums paid.

9. The process of claim 7, wherein the customer-identifying information includes claims in a time period.

10. The process of claim 7, wherein the customer-identifying information includes losses paid.

11. The process of claim 7, wherein the customer-identifying information includes reserves.

12. The process of claim 7, wherein the customer-identifying information includes an insurance history.

13. The process of claim 7, wherein the customer-identifying information includes a customer-specific adjustment to a cost for purchasing said insurance policies.

14. The process of claim 7, further comprising the step of controlling the digital electrical computer system with said logic means to receive agent-identifying data for both of the insurance policies in one of the states, the agent-identifying data including the identity of an agent for both said insurance policies.

15. The process of any one of claims 6–14, further comprising the step, subsequent to the step of providing but prior to the step of controlling, directing the digital electrical computer system with said logic means to compute respective premiums from the respective rates for each said insurance policy in one of the sets.

16. The process of claim 15, wherein at least one of the insurance policies in the set has a carrier that is not a property and casualty company.

17. A process using a computerized data processing system programmed to use data to produce a customized application form for at least a portion of multiple insurance policy worker's compensation coverage, the process comprising the steps of:

storing in an electrical data processing system comprised of a digital electrical computer connected to electrically communicate with a key board, a memory, and a printer, a template and a respective application form for a first insurance policy for use in combination with at least a second insurance policy, said insurance policies collectively satisfying all statutory coverage requirements for workers' compensation in at least one state without paying a nongovernmental assessment or a nongovernmental assignment;

controlling said digital electrical computer with a program to receive data input at said key board to insert said data into the first template to produce a first customized application form for said first policy.

18. The process of claim 17, further comprising the step of controlling said programmed digital electrical computer to store the first customized application form in the memory.

19. The process of claim 17, further comprising the step of controlling said programmed digital electrical computer to receive a second input insurance application form template for said second insurance policy, the second template being input at the key board and stored in the memory, and further controlling said programmed digital electrical computer to receive further data, to insert said further data into the second template to produce a second customized application form, and to print said second customized application form at said printer.

20. The process of claim 19, wherein said step of further controlling said programmed digital electrical computer to receive further data includes obtaining the data used in completing the first application form.

21. The process of claim 19, further comprising the step of further controlling said programmed digital electrical computer to receive at said key board customer data, to store the customer data in said memory, and to use said customer data in completing both the first customized application form and the second customized application form.

22. The process of claim 19, further comprising the step of controlling said programmed digital electrical computer to store the first customized application form in the memory and to store the second customized application form in the memory.

23. A process for using a machine to use data entered for a first insurance policy in processing for a second insurance policy that collectively satisfy all statutory coverage requirements for worker's compensation in at least one state without paying a National Council on Compensation Insurance charge, the process comprising:

in an digital computer system including a digital electrical computer electrically connected to memory, to input means, and to output means, controlling the system, with a program to perform the step of generating a first premium as output at said output means, wherein the generating includes computing the first premium from a first set of rates entered at the input means, the rates being those for a first insurance policy and to perform the step of generating a second premium as output at said output means, wherein the generating includes computing the second premium from a second set of rates entered at the input means, the rates being those for a second insurance policy;

wherein said first insurance policy and said second insurance policy are selected for use in combination such that the insurance policies collectively provide a coverage satisfying all statutory requirements for workers' compensation in at least one state; and wherein at least one of said premiums does not include a National Council on Compensation Insurance charge.

24. The process of claim 23, wherein the steps of controlling the computer system with logic means are carried out such that a total formed from addition of the premium computed for the first insurance policy plus the premium computed for the second insurance policy is less than an amount corresponding to a premium for the coverage by a standard workers' compensation policy approved in the same state as the first insurance policy and the second insurance policy, the total being less than the amount due to an absence of a computing step in which the National Council on Compensation Insurance charge is added in forming the total.

25. A process for using a machine to use data entered for a first insurance policy in processing for a second insurance policy that collectively satisfy all statutory coverage requirements for worker's compensation in at least one state without computing either a private assessment charge or a private assignment charge, the method comprising:

controlling a digital electrical computer system including a processor electrically connected to memory, to input means, and to output means, with a program to perform the step of generating a first premium as output at said output means, wherein the step of generating includes computing a first premium from a first set of rates for said first insurance policy combined with at least a second insurance policy to collectively satisfy statutory coverage requirements for workers' compensation in at least one state, and wherein the generating is carried out without computing either a private assessment charge or a private assignment charge.

26. The process of claim 25, wherein the computing the first premium includes multiplying an employer's payroll for the employees in at least one pre-determined employment classification times a corresponding one of the first set of rates to produce a respective product.

27. The process of claim 25, wherein the computing is carried out for a plurality of employment classifications such that a plurality of respective products are produced, and includes forming a sum of the products, using the sum to form a subtotal, and reducing the subtotal to determine the premium as adjusted to reflect a discount.

28. The process of claim 25, wherein the computing is carried out for a plurality of employment classifications such that a plurality of products are produced, and includes forming a sum of the products, using the sum to form a subtotal, and reducing the subtotal to determine the premium as adjusted to reflect a credit.

29. The process of claim 25, wherein the computing is carried out for a plurality of employment classifications such that a plurality of products are produced, and includes forming a sum of the products, using the sum to form a subtotal, and increasing the subtotal to determine the premium and a tax.

30. The process of claim 25, wherein the computing is carried out for a plurality of employment classifications such that a plurality of products are produced, and includes forming a sum of the products, using the sum to form a subtotal, and increasing the subtotal to determine the premium as adjusted to reflect a fee.

31. The process of claim 25, wherein the computing is carried out for a plurality of employment classifications such that a plurality of products are produced, and includes forming a sum of the products and using the sum to form a subtotal, the subtotal being optionally adjustable.

32. The process of any one of claims 25–31, further comprising the step of controlling the computer system with logic means to perform the step of generating a second premium as output at said output means, wherein the generating includes computing the second premium from a second set of rates entered at the input means, the rates being those for the second insurance policy.

33. The process of claim 32, wherein said steps of generating the first premium and of generating the second premium both include multiplying an employer's payroll for the employees in a pre-determined employment classification of the first insurance policy times one of the rates to produce a respective product.

34. The process of claim 32, further comprising the step of controlling the computer system with the logic means to calculate a set of deposit premiums for a customer purchasing a set of the first insurance policy and the second insurance policy.

35. The process of claim 32, wherein said process is carried out for one of said insurance policies being an accident, health, and life insurance policy.

36. A process for making an electrical digital computer system programmed to generate output including a premium for a first insurance policy and a premium for a second insurance policy for combined coverage that collectively satisfies all statutory coverage requirements for workers' compensation in at least one state without paying either a nongovernmental charge for an assessment or a nongovernmental charge for an assignment, the process comprising the steps of:

provinding a processor electrically connected to a memory, to input means, and to output means in forming a digital electrical computer system;

programming said processor for controlling the digital computer system to receive multiple related insurance policy data at said input means, to store said multiple related insurance policy data in said memory, to determine from said multiple related insurance policy data a premium for the first insurance policy and a premium for the second insurance policy for collective coverage that satisfies all statutory coverage requirements for workers' compensation in at least one state without paying either a nongovernmental charge for an assessment or a nongovernmental charge for an assignment, and to generate output data including said premiums at said output means.

37. The process of claim 36, further comprising the step of:

programming said processor with the logic means to store in said memory employment classifications for both said insurance policies, the rates for the first insurance policy, and the rates for the second insurance policy; and wherein said computing a premium for the first insurance policy includes accessing said memory to designate a first selected rate and multiplying an input employer's payroll for employees in at least one of the employment classifications times the first selected rate to produce a product for the first premium and wherein said computing the second premium includes accessing said memory to designate a second selected rate and multiplying the employer's payroll for the employees in a pre-determined employment classification times the second selected rate to produce a second product for the second premium.

38. A method for computing premiums to be charged for multiple insurance policy coverage equivalent to that provided by standard worker's compensation policy coverage, the method including the steps of:

computing a premium to be charged for coverage under the worker's compensation insurance policy from rates for insuring employees in employment classifications for a worker's compensation policy;

computing a premium to be charged for the employer's liability insurance policy from rates for insuring employees in employment classifications for an employer's liability insurance policy;

wherein said steps of computing are carried out digitally with at least one program to control producing the premiums to be charged for the insurance policy coverage to be equivalent to that provided by said standard worker's compensation coverage.

39. The method of claim 38, wherein the steps of computing the premiums do not include a portion for payment of a nongovernmental payment either for an assessment or for an assignment.

* * * * *